(12) United States Patent
Tomita et al.

(10) Patent No.: US 7,718,339 B2
(45) Date of Patent: May 18, 2010

(54) ELECTROSTATIC IMAGE DEVELOPING TONER AND IMAGE FORMING APPARATUS USING THE SAME

(75) Inventors: Masami Tomita, Numazu (JP); Ken Umehara, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/210,361

(22) Filed: Sep. 15, 2008

(65) Prior Publication Data

US 2009/0011356 A1    Jan. 8, 2009

Related U.S. Application Data

(63) Continuation of application No. PCT/JP2007/055002, filed on Mar. 13, 2007.

(30) Foreign Application Priority Data

Mar. 14, 2006 (JP) ............... 2006-069932
Jun. 30, 2006 (JP) ............... 2006-181252

(51) Int. Cl.
*G03G 9/00* (2006.01)

(52) U.S. Cl. .................... 430/109.4; 399/252

(58) Field of Classification Search ............ 430/109.4; 399/252
See application file for complete search history.

(56) References Cited

U.S. PATENT DOCUMENTS

2006/0204880 A1 * 9/2006 Mizutani et al. ......... 430/109.4

FOREIGN PATENT DOCUMENTS

| JP | 53-128648 | 11/1978 |
|---|---|---|
| JP | 61-120161 | 6/1986 |
| JP | 4-362956 | 12/1992 |
| JP | 10-228130 | 8/1998 |
| JP | 2003-57875 | 2/2003 |
| JP | 2004-151246 | 5/2004 |
| JP | 2004-151709 | 5/2004 |
| JP | 2004-177607 | 6/2004 |
| JP | 2004-302458 | 10/2004 |
| JP | 2005-91883 | 4/2005 |
| JP | 2005-99082 | 4/2005 |
| JP | 2005-115352 | 4/2005 |
| JP | 2005-164800 | 6/2005 |
| JP | 2005-301261 | 10/2005 |
| JP | 2005-314686 | 11/2005 |
| JP | 2006-243715 | * 9/2006 |

OTHER PUBLICATIONS

Machine translation of JP 2006-243715.*

* cited by examiner

*Primary Examiner*—Mark A Chapman
(74) *Attorney, Agent, or Firm*—Oblon, Spivak, McClelland, Maier & Neustadt, L.L.P.

(57) ABSTRACT

Provided is an electrostatic image developing toner excellent in blocking resistance at high temperature and humidity, as well as in low temperature-fixing property, having a polyester resin toner binder. Provided is the electrostatic image developing toner containing at least one noncrystalline polyester resin and a crystalline polyester resin, wherein the polyester resins are formed in the presence of at least one titanium-containing catalyst expressed in the following Formulas:

$$Ti(-X)m(-OH)n$$

$$O=Ti(-X)p(-OR)q$$

where X is a residue resulting from removing an H atom in one hydroxyl group from (poly)alkanolamine having 2 to 12 carbon atoms, R represents an H atom or an alkyl group that has 1 to 8 carbon atoms and may contain 1 to 3 ether bonds, m, n, p, and q are integers; m, n, p, and q are 1-4, 0-3, 1-2, 0-1, respectively; and the sum of m and n, and p and q are 4 and 2, respectively.

20 Claims, No Drawings

ELECTROSTATIC IMAGE DEVELOPING TONER AND IMAGE FORMING APPARATUS USING THE SAME

CROSS-REFERENCES TO RELATED APPLICATIONS

This is a continuation of Application No. PCT/JP2007/055002 filed on Mar. 13, 2007.

BACKGROUND OF THE INVENTION

1. Field of the Invention

The present invention relates to a toner for forming a visible image from an electrostatic image formed on a surface of an image bearing member such as a photoconductor in electrophotography or electrostatic recording and also relates to an image forming apparatus using the toner.

2. Description of the Related Art

Electrophotography used in image forming apparatuses such as laser printers and dry electrostatic copiers includes uniformly charging a photoconductive insulation layer (charging step), exposing the layer to light, forming an electrical latent image by eliminating charges on the portions exposed to light (exposing step), forming a visible image by further attaching colored, charged fine powder, which is called a toner, to the latent image (developing step), transferring the visible image thus obtained onto a transfer material such as transfer paper (transfer step), and then permanently fixing the transferred image by an appropriate fixation method such as heating, pressurizing, or the like (fixing step).

In the fixing step, for example, commonly carried out is contact type heat fixing such as heating roller fixing in which a transferred image is fixed by heating and melting using a heating roller, and noncontact type heat fixing such as oven fixing. Recently, with an increased demand for energy conservation, a request is increased for reducing electric power consumption in a fixing step, which occupies a considerable part of the total electric power consumed by a copier. In this regard, the contact type heat fixing is preferred to the noncontact type heat fixing, because the contact type heat fixing is superior in heat efficiency, is capable of lowering a required fixing temperature as compared to a fixing temperature required for non-contact type heat fixing, and is effective in energy conservation and in downsizing of copiers.

However, in the contact type heat fixing method, an offset phenomenon is likely to occur disadvantageously, in which a part of toner melted at the time of fixing is transferred to a heating roller and then transferred to successive transfer paper sheets, etc. For prevention of this offset phenomenon, conventionally, the surface of a heating roller is coated with a material superior in releasing property such as fluorine resin, or a releasing agent such as silicone oil is applied to the surface of a heating roller. However, when silicone oil, etc. is used, the fixing device is required to be larger and more complex, leading to high production costs and causing frequent failures of the device.

Alternatively when a heating roller is used at a lowered temperature for prevention of the offset phenomenon, a toner is not sufficiently melted to cause an insufficient fixation because of the lowered temperature of the heating roller.

From the viewpoint of conserving energy and downsizing apparatuses, a toner is desired in which the offset occurrence temperature is high (hot-offset resistance) and the fixing temperature is low (low temperature-fixing property). Furthermore, the toner is further requested to have enough heat resistant storage stability so as not to undergo blocking during storage under the atmospheric temperature and humidity in the apparatus.

For solving these problems, for example, a toner binder is developed in which two types of resins with different softening points are mixed (see Japanese Patent Application Laid-Open (JP-A) No. 04-362956). However, in this method, as the mixing ratio of the amount of the resin with a lower softening point against the amount of the resin with the higher softening point is increased, blocking resistance and hot-offset resistance degrade, though low temperature-fixing property is improved, and in a region where the toner image is fixed at low temperatures, a difference between the softening temperature of the polyester with the lower softening temperature and the lower limit fixing temperature, becomes large, leading to an insufficient sharp melt property in the low temperature region. Therefore, in view of recent copiers' high-speed performance, down sizing, and saving of energy, a further improvement in low temperature-fixing property and offset resistance is desired.

Furthermore a toner is disclosed, which is obtained by dissolving and/or dispersing in an organic solvent a toner composition containing a modified polyester resin capable of reacting with an active hydrogen group-containing compound, and reacting the solution or the dispersion with a cross-linking agent and/or an elongating agent in an aqueous medium containing fine resin particles, in which a toner binder contains a crystalline polyester resin in addition to the modified polyester resin (see JP-A No. 2004-302458). In this case, since the crystalline polyester resin contained in the toner has crystallinity, the toner exhibits heat melting property that shows a sharp decrease in viscosity at a temperature close to the fixation beginning temperature, heat resistant storage stability is favorable because of the crystallinity immediately before the temperature at which the melting begins and at the melt beginning temperature, the viscosity of the toner sharply decreases (sharp melt property) and the toner is fixed. Therefore the proposal can provide a toner with excellent heat resistant storage ability as well as favorable low temperature-fixing property.

Further, an electrophotographic toner containing a toner binder and a colorant is disclosed, in which the toner binder contains three main components, that is, (A) a resin having a softening point in the range of 120° C. to 170° C., a glass transition temperature in the range of 58° C. to 75° C., and a rate of chloroform insoluble matter in the range of 5% by mass to 50% by mass, (B) a resin having a softening point in the range of 90° C. to 120° C. and a glass transition temperature in the range of 58° C. to 75° C., and (C) a crystalline polyester resin having a melting point in the range of 80° C. to 140° C.; the toner binder has a rate of chloroform insoluble matter of less than 30% by mass, and the toner contains a wax (W) having a penetration of 1.5 or less and a melting point in the range of 80° C. to 110° C. (see JP-A No. 2003-57875). In this case, to the two types of resins with different softening points, that is, resins (A) and (B), the resin (C) of crystalline polyester resin having a low melting point is melt-kneaded such that the resin (C) is uniformly dispersed in the resins (A) and (B) to thereby produce a toner excellent in hot-offset resistance and blocking resistance while maintaining excellent low-temperature fixing property.

A toner resin composition containing a crystalline polymer having a melting point in the range of 180° C. to 280° C. in which an absorption amount of heat at the melting point measured by a differential scanning calorimeter (DSC) is in the range of 25 mJ/mg to 150 mJ/mg, and containing a non-crystalline polyester resin having a glass transition temperature in the range of 30° C. to 80° C. is disclosed, wherein the noncrystalline polyester resin contains first noncrystalline polyester resin having weight average molecular weights in the range of 3,000 to 20,000 and second noncrystalline polyester resin having weight average molecular weights in the range of 30,000 to 300,000 (see JP-A No. 2004-151709). When this toner resin composition is used, a toner can be prepared which is excellent in low temperature-fixing property, hot-offset resistance, and blocking resistance and enables favorable coloring. In this case, physically cross-linked structure is formed among crystalline components of the crystalline polymer having a high melting point in the noncrystalline polyester resin, meantime, the noncrystalline components in the crystalline polymer having a high melting point are entangled with the noncrystalline polyester resin to form a sort of network structure. By forming such a network structure, the toner makes it possible to exhibit favorable offset resistance without causing a substantial reduction in viscosity at high temperatures and without decreasing low temperature-fixing property and storage stability.

Furthermore, a toner is disclosed, in which, when a toner binder is composed of at least a toner binder component LR and a toner binder component HR, Tlr3 (° C.) is a temperature at which the melt viscosity characteristics of the toner binder component LR are $1 \times 10^3$ (Pa·S), Thr3 (° C.) is a temperature at which the melt viscosity characteristics of the toner binder component HR are $1 \times 10^3$ (Pa·S), and Tcr3 (° C.) is a temperature (a peak temperature of heat absorption measured by a DSC method) at which the melt viscosity characteristics of a crystalline resin component CR are $1 \times 10^3$ (Pa·S) (see JP-A No. 2005-164800), Tlr3 is in the range of 90° C. to 125° C., Thr3 is in the range of 155° C. to 210° C., and Tcr3 is in the range of 95° C. to 150° C. In this case, when the toner binder contains resin components having the above characteristics, a toner can be obtained which provides a favorable image quality, a wide range of fixing temperatures, and also favorable blocking resistance.

In the above related art, even when a plurality of resins having significantly different softening point ranges are mixed, by adding a crystalline polyester resin into one or more types of noncrystalline resins, each of original resin characteristics are maintained in each toner. However, in these cases, after crystalline polyester resin is added into noncrystalline polyester resin and the mixture is once heated, the noncrystalline polyester resin and the crystalline polyester resin dissolves each other, which results in inability to obtain each of the original resin characters. As a result, toner with satisfactory blocking resistance and image quality is difficult to obtain. Furthermore, in the related art, an organic or inorganic tin compound, which is environmentally problematic, is sometimes used as a catalyst for synthesis of polyester of a raw material for toner.

BRIEF SUMMARY OF THE INVENTION

As a result of carrying out earnest examinations to solve the above mentioned problems in the related art, the present inventors found that the above mentioned problems in the related art can be solved by using a toner binder composed of polycondensation polyester resins formed in the presence of a specific catalyst and using a combination of noncrystalline polyester resin (A) and crystalline polyester resin (B) as the polycondensation polyester resins. The present invention is thus accomplished based on the findings.

An object of the present invention is to provide a toner containing a noncrystalline polyester resin and a crystalline polyester resin, which is excellent in blocking resistance under conditions of high temperature and high humidity, in low temperature-fixing property at the time of fixing, and in hot-offset resistance, and to provide an image forming apparatus using the toner. Means for solving the above problems are as follows:

<1> An electrostatic image developing toner including at least a toner binder, a colorant, and a releasing agent, wherein the toner binder contains at least one noncrystalline polyester resin (A) and a crystalline polyester resin (B), and the at least one noncrystalline polyester resin (A) and/or the crystalline polyester resin (B) are/is formed in the presence of at least one titanium-containing catalyst (a) expressed by any one of General Formulas (I) and (II),

where X is a residue resulting from removing a hydrogen atom in one hydroxyl group from mono-alkanolamine or poly-alkanolamine having 2 to 12 carbon atoms, a second hydroxyl group in the polyalkanolamine may be intramolecularly polycondensed with a third hydroxyl group directly bound to the same Ti atom to form a cyclic structure or may be intermolecularly polycondensed with a fourth hydroxyl group directly bound to other Ti atom to form a repeating structure; when the repeating structure is formed, the polymerization degree is 2 to 5; R represents an H atom or an alkyl group that has 1 to 8 carbon atoms and may contain 1 to 3 ether bonds; "m" is an integer of 1 to 4; "n" is an integer of 0 to 3; the sum of "m" and "n" is 4; "p" is an integer of 1 to 2; "q" is an integer of 0 to 1; the sum of "p" and "q" is 2; when "m" or "p" is 2 or more, each X may be the same or different, wherein the electrostatic image developing toner is used in an image forming apparatus which develops an electrostatic image on a latent image bearing member using the toner to form a toner image, transfers the toner image onto a transfer medium, fixes the toner image on the transfer medium by heating and/or pressurizing the toner image.

<2> The electrostatic image developing toner according to the item <1>, wherein the electrostatic image developing toner is produced by pulverization after melt-kneading.

<3> The electrostatic image developing toner according to the item <1>, wherein the electrostatic image developing toner is obtained by emulsifying, dispersing, and agglutinating, in an aqueous medium, particles which contain particles of the at least one noncrystalline polyester resin (A) and particles of the crystalline polyester resin (B).

<4> The electrostatic image developing toner according to the item <3>, wherein the electrostatic image developing toner has a core-shell structure composed of a core portion formed of core particles containing core resin particles (C) and of a shell portion formed of fine shell particles containing shell resin particles (S).

<5> The electrostatic image developing toner according to the item <4>, wherein the electrostatic image developing toner is produced by a method which includes at least forming the core particles containing the core resin particles (C) which contains particles of the noncrystalline polyester resin (A) and/or particles of the crystalline polyester resin (B) by heat-fixing the core resin particles (C) while agglutinating the core resin particles (C) to prepare a core particle dispersion, forming shell-formed particles by adding and mixing the shell resin particles (S) in the core particle dispersion so as to attach shell fine particles containing the shell resin particles (S) to surfaces of the core particles, and heating a dispersion of the shell-formed particle.

<6> The electrostatic image developing toner according to the item <5>, wherein the shell resin particles (S) contain particles of the noncrystalline polyester resin (A).

<7> The electrostatic image developing toner according to any one of the items <4> to <6>, wherein the core portion of the core-shell structure contains particles of the crystalline polyester resin (B).

<8> The electrostatic image developing toner according to any one of the items <5> to <7>, wherein the mixing ratio by mass (C):(S) of the core resin particles (C) to the shell resin particles (S) is in the range of 50:50 to 90:10.

<9> The electrostatic image developing toner according to any one of the items <1> to <8>, wherein X in any one of the General Formulas (I) and (II) is a residue resulting from removing a hydrogen atom in one hydroxyl group from di-alkanolamine or tri-alkanolamine.

<10> The electrostatic image developing toner according to any one of the items <1> to <9>, wherein any one of "m" and "p" in the General Formulas (I) and (II) is an integer of 2 or more and all of a plurality of Xs represent the same group.

<11> The electrostatic image developing toner according to any one of the items <1> to <10>, wherein at least part of the noncrystalline polyester resin (A) and/or the crystalline polyester resin (B) is modified with a polyepoxide (c).

<12> The electrostatic image developing toner according to any one of the items <1> to <11>, wherein the weight average particle diameter (D4) of the electrostatic image developing toner is in the range of 3.0 µm to 10.0 µm, and a ratio (D4/Dn) of the weight average particle diameter (D4) to the number average particle diameter (Dn) is in the range of 1.05 to 1.30.

<13> The electrostatic image developing toner according to any one of the items <1> to <12>, wherein the electrostatic image developing toner has an average circularity of 0.90 to 0.99.

<14> The electrostatic image developing toner according to any one of the items <1> to <13>, wherein 50% by number or more of particles of the electrostatic image developing toner have a circularity of 0.93 to 0.97.

<15> The electrostatic image developing toner according to any one of the items <1> to <14>, wherein the noncrystalline polyester resin (A) has a glass transition temperature of 50° C. to 80° C., a softening point of 80° C. to 130° C., and an acid value of 0.2 mgKOH/g to 50 mgKOH/g.

<16> The electrostatic image developing toner according to any one of the items <1> to <15>, wherein the number average molecular weight (Mn) of the noncrystalline polyester resin (A) is in the range of 1,000 to 10,000, and a ratio (Mw/Mn) of the weight average molecular weight (Mw) to the number average molecular weight (Mn) of the noncrystalline polyester resin (A) is in the range of 2 to 10.

<17> The electrostatic image developing toner according to any one of the items <1> to <16>, wherein the storage elastic modulus of the noncrystalline polyester resin (A) at 100° C. is in the range of $10^3$ Pa to $10^6$ Pa and the storage elastic modulus of the noncrystalline polyester resin (A) at 150° C. is in the range of $10^2$ Pa to $10^4$ Pa.

<18> The electrostatic image developing toner according to any one of the items <1> to <17>, wherein the noncrystalline polyester resin (A) contains as a copolymer component a divalent carboxylic acid having a sulfonic acid group.

<19> The electrostatic image developing toner according to any one of the items <1> to <18>, wherein the average dispersion particle diameter of the colorant in the toner is in the range of 0.05 µm to 0.50 µm.

<20> The electrostatic image developing toner according to any one of the items <1> to <19>, wherein the average dispersion particle diameter of the releasing agent in the toner is in the range of 0.2 µm to 2.0 µm.

<21> The electrostatic image developing toner according to any one of the items <1> to <20>, wherein the amount of the releasing agent present in the vicinity of a surface of the toner ([amount of releasing agent]/{[amount of releasing agent]+ [amount of resin]}) is in the range of 0.5% by mass to 10% by mass.

<22> The electrostatic image developing toner according to any one of the items <1> to <21>, further including at least a fatty acid amide and/or fine inorganic particles.

<23> An image forming apparatus including at least a latent image bearing member configured to bear a latent image for forming an electrophotographic image, a developing unit configured to develop the latent image on the latent image bearing member using a toner in the developing unit, a transfer unit configured to transfer a toner image formed on a surface of the latent image bearing member to a transfer medium, a cleaning unit configured to remove a residual toner remained on a surface of the image bearing member, and a fixing unit configured to fix the toner image transferred onto the transfer medium by heating and/or pressurizing the toner image, wherein a member in the cleaning unit configured to remove the residual toner is composed of an elastic blade, and the toner is the electrostatic image developing toner according to any one of the items <1> to <22>.

<24> The image forming apparatus according to the item <23>, wherein a member in the fixing unit configured to fix the toner image is composed of a belt or sheet material.

According to the present invention, the above mentioned problems of the related art can be solved, and a toner which is excellent in blocking resistance under conditions of high temperature and high humidity, in low temperature-fixing property at the time of fixing, and in hot-offset resistance, and an image forming apparatus using the toner can be provided.

An electrostatic image developing toner of the present invention is composed of at least a toner binder, a colorant, and a releasing agent, wherein the toner binder contains at least one noncrystalline polyester resin (A) and a crystalline polyester resin (B), and the at least one noncrystalline polyester resin (A) and/or the crystalline polyester resin (B) are formed in the presence of at least one titanium-containing catalyst (a) expressed by any one of General Formulas (I) and (II).

$$Ti(—X)m(—OH)n \qquad (I)$$

$$O=Ti(—X)p(—OR)q \qquad (II)$$

In the General Formulas (I) and (II), X is a residue resulting from removing a hydrogen atom in one hydroxyl group from mono-alkanolamine or poly-alkanolamine having 2 to 12 carbon atoms, a second hydroxyl group in the polyalkanolamine may be intramolecularly polycondensed with a third hydroxyl group directly bound to the same Ti atom to form a cyclic structure or may be intermolecularly polycondensed with a fourth hydroxyl group directly bound to other Ti atom to form a repeating structure; when the repeating structure is formed, the polymerization degree is 2 to 5; R represents an H atom or an alkyl group that has 1 to 8 carbon atoms and may contain 1 to 3 ether bonds; "m" is an integer of 1 to 4; "n" is an integer of 0 to 3; the sum of "m" and "n" is 4; "p" is an integer of 1 to 2; "q" is an integer of 0 to 1; the sum of "p" and "q" is 2; when "m" or "p" is 2 or more, each X may be the same or different.

An image forming apparatus according to the present invention is equipped with an image bearing member configured to bear a latent image for forming an electrophotographic image, a developing unit configured to develop the latent image on the image bearing member with toner in the developing unit, a transfer unit configured to transfer a toner image formed on a surface of the image bearing member to a transfer medium, a cleaning unit configured to remove residual toner remained on a surface of the image bearing member, and a fixing unit configured to fix the toner image transferred onto the medium by heating and/or pressurizing the toner image, wherein a member configured to remove the residual toner in the cleaning unit is composed of an elastic blade, and the toner is an electrostatic image developing toner according to the present invention.

Preferred aspects of the electrostatic image developing toner of the present invention are, for example, as follows: an aspect where the electrostatic image developing toner is produced by pulverization after melt-kneading; an aspect where the electrostatic image developing toner is obtained by emulsifying and dispersing toner binder particles in an aqueous catalyst and further by agglutinating the toner binder particles, or by melting, kneading, and pulverizing the toner binder particles; an aspect where the toner has a core-shell structure composed of a core portion formed of core particles containing core resin particles (C) and of a shell portion formed of fine shell particles containing shell resin particles (S); an aspect where the toner is produced by a method which includes at least: forming core particles containing core resin particles (C) which contains particles of the noncrystalline polyester resin (A) and/or particles of the crystalline polyester resin (B) by heat-fixing the core resin particles (C) while agglutinating the core resin particles to prepare a core particle dispersion, forming shell-formed particles by adding and mixing the shell resin particles (S) in the core particle dispersion so as to attach shell fine particles containing the shell resin particles (S) to surfaces of the core particles, and by heating a dispersion of the shell-formed particle; an aspect where the shell resin particles (S) contain particles of the noncrystalline polyester resin (A); an aspect where the core portion of the core-shell structure contains particles of the crystalline polyester resin (B); an aspect where the mixing ratio by mass (C):(S) of the core resin particles (C) to the shell resin particles (S) is in the range of 50:50 to 90:10; an aspect wherein X in any one of the General Formulas (I) and (II) is a residue resulting from removing a hydrogen atom in one hydroxyl group from di-alkanolamine or tri-alkanolamine; an aspect where any one of "m" and "p" in the General Formulas (I) and (II) is an integer of 2 or more and all of a plurality of Xs represent the same group; an aspect where at least part of the noncrystalline polyester resin (A) and/or the crystalline polyester resin (B) is modified with a polyepoxide (c); an aspect where the weight average particle diameter (D4) of the electrostatic image developing toner is in the range of 3.0 μm to 10.0 μm, and a ratio (D4/Dn) of the weight average particle diameter (D4) to the number average particle diameter (Dn) is in the range of 1.05 to 1.30; an aspect where the electrostatic image developing toner has an average circularity of 0.90 to 0.99; an aspect where 50% by number or more of particles of the electrostatic image developing toner have a circularity of 0.93 to 0.97; an aspect where the noncrystalline polyester resin (A) has a glass transition temperature of 50° C. to 80° C., a softening point of 80° C. to 130° C., and an acid value of 0.2 mgKOH/g to 50 mgKOH/g; an aspect where the number average molecular weight (Mn) of the noncrystalline polyester resin (A) is in the range of 1,000 to 10,000, and a ratio (Mw/Mn) of the weight average molecular weight (Mw) to the number average molecular weight (Mn) of the noncrystalline polyester resin is in the range of 2 to 10; an aspect where the storage elastic modulus of the noncrystalline polyester resin (A) at 100° C. is in the range of $10^3$ Pa to $10^6$ Pa and the storage elastic modulus of the noncrystalline polyester resin at 150° C. is in the range of $10^2$ Pa to $10^4$ Pa; an aspect where the noncrystalline polyester resin (A) contains as a copolymer component a divalent carboxylic acid having a sulfonic acid group; an aspect where the average dispersion particle diameter of the colorant in the toner is in the range of 0.05 μm to 0.50 μm; an aspect where the average dispersion particle diameter of the releasing agent in the toner is in the range of 0.2 μm to 2.0 μm; an aspect where the amount of the releasing agent present in the vicinity of a surface of the toner ([amount of releasing agent]/{[amount of releasing agent]+[amount of resin]}) is in the range of 0.5% by mass to 10% by mass; and an aspect where the electrostatic image developing toner further includes a fatty acid amid and/or fine inorganic particles.

Furthermore, preferred aspects of an image forming apparatus according to the present invention include, for example, an aspect where a member in the fixing unit configured to fix the toner image is composed of a belt or sheet material.

DETAILED DESCRIPTION OF THE INVENTION

The present invention will be described in detail below, however, the present invention is intended to cover various modifications as long as they do not impair the objects of the present invention.

For the titanium-containing catalyst (a) used in the present invention, compounds expressed by the General Formulas (I) and (II) are exemplified. These may be used alone or in combination of two or more.

In the General Formulas (I) and (II) above, X represents a residue which is produced by removing a hydrogen atom from one hydroxyl group of mono- or poly-alkanolamine having 2 to 12 carbon atoms; the number of nitrogen atoms, i.e. the total number of primary, secondary and tertiary amino groups, is usually 1 or 2, and preferably 1.

Examples of the monoalkanolamine include ethanolamine and propanolamine. Examples of the polyalkanolamine include dialkanolamines (such as diethanolamine, N-methyldiethanolamine and N-butyldiethanolamine), trialkanolamines (such as triethanolamine and tripropanolamine), and tetraalkanolamines (such as N,N,N',N'-tetrahydroxyethylethylenediamine).

In the case of the polyalkanolamines, the polyalkanolamines have at least one hydroxyl group in addition to a hydroxyl group that is used for forming Ti—O—C bond with a Ti atom and results in a residue from which a hydrogen atom has been removed; this additional hydroxyl group in the polyalkanolamine may be intramolecularly polycondensed with a second hydroxyl group directly bound to the same Ti atom to form a cyclic structure or may be intermolecularly polycondensed with a third hydroxyl group directly bound to other Ti atom to form a repeating structure.

In cases of the repeating structure, the polymerization degree is 2 to 5. In cases where the polymerization degree is above 5, the catalytic activity tends to be lower, which may increase the amount of oligomers and degrade blocking resistance of toner.

Among these, X is preferably a residue of a dialkanolamine (in particular diethanolamine) or a residue of a trialkanolamine (in particular triethanolamine), and is particularly preferably the residue of triethanolamine.

R represents one of a hydrogen atom (H) and an alkyl group having 1 to 8 carbon atoms that may have 1 to 3 ether bonds. Examples of the alkyl group having 1 to 8 carbon atoms include methyl group, ethyl group, n-propyl group, isopropyl group, n-butyl group, n-hexyl group, n-octyl group, β-methoxyethyl group, and β-ethoxyethyl group. Among these, R is preferably a hydrogen atom or an alkyl group having 1 to 4 carbon atoms having no ether bond, more preferably, a hydrogen atom, an ethyl group or an isopropyl group.

In the General Formula (I) above, "m" represents an integer of 1 to 4, and preferably an integer of 1 to 3; "n" represents an integer of 0 to 3, and preferably an integer of 1 to 3; the sum of "m" and "n" is 4.

In the General Formula (II) above, "p" represents an integer of 1 or 2; "q" represents an integer of 0 or 1; the sum of "p" and "q" is 2. In case that "m" or "p" is 2 or more, Xs may be identical or different each other, and preferably all Xs are identical.

Specific examples of compounds expressed by the General Formula (I) include titanium dihydroxybis (triethanolaminato), titanium trihydroxytriethanolaminato, titanium dihydroxybis (diethanolaminato), titanium dihydroxybis (monoethanolaminato), titanium dihydroxybis (monopropanolaminato), titanium dihydroxybis (N-methyldiethanolaminato), titanium dihydroxybis (N-buthyldiethanolaminato), reaction products of tetrahydroxy titanium with N,N,N',N'-tetrahydroxy ethylethylenediamine, and intramolecular polycondensation products or intermolecular polycondensation products of these compounds.

Specific examples of compounds expressed by the General Formula (II) include titanylbis (triethanolaminato), titanylbis (diethanolaminato), titanylbis (monoethanolaminato), titanylhydroxyethanolaminato, titanylhydroxytriethanolaminato, titanylethoxytriethanolaminato, titanylisopropoxytriethanolaminato, and intramolecular or intermolecular polycondensation products of these compounds.

Among these compounds, preferred are titanium dihydroxybis (triethanolaminato), titanium dihydroxybis (diethanolaminato), titanylbis (triethanolaminato), polycondensation products thereof, and combinations of these compounds; more preferred are titanium dihydroxybis (triethanolaminato) and polycondensation products thereof; particularly preferred is titanium dihydroxybis (triethanol aminato).

The above mentioned titanium-containing catalysts (a) may be stably obtained, for example, by reaction of a commercially available titanium dialkoxybis (alcoholainato) (supplied by Du Pont Kabushiki Kaisha) at 70° C. to 90° C. in the presence of water.

[Synthesis of Noncrystalline Polyester Resin]

Examples of noncrystalline polycondensed polyester resins constituting a toner binder according to the present invention include noncrystalline polyester resins (AX), which are polycondensation products with polyols and polycarboxylic acids, and modified noncrystalline polyester resins (AY) obtained by reacting (AX) further with polyepoxides (c), and so forth. These (AX) and (AY) may be used alone or in combination of two or more.

Examples of the polyol include diols (g) and trivalent or more polyols (h).

Examples of the polycarboxylic acid include dicarboxylic acids (i) and trivalent or more polycarboxylic acids (j).

These polyols and polycarboxylic acids may be used alone or in combination of two or more.

Examples of the noncrystalline polyester resin (AX) and (AY) include those shown below. These may be used alone or in combination of two or more.

(AX1): linear noncrystalline polyester resins prepared from diols (g) and dicarboxylic acids (i);

(AX2): nonlinear noncrystalline polyester resins prepared from diols (g) and dicarboxylic acids (i) along with polyols (h) and/or polycarboxylic acids (O);

(AY1): modified noncrystalline polyester resins obtained by reacting (AX2) with polyepoxide (c).

Examples of the diol (g) include those having a hydroxyl value of 180 mgKOH/g to 1900 mgKOH/g. Specific examples thereof include alkylene glycols having 2 to 36 carbon atoms (such as ethylene glycol, 1,2-propylene glycol, 1,3-propylene glycol, 1,4-butylene glycol, and 1,6-hexanediol), alkyleneether glycols having 4 to 36 carbon atoms (such as diethylene glycol, triethylene glycol, dipropylene glycol, polyethylene glycol, polypropylene glycol, and polybutylene glycol), cycloaliphatic diols having 6 to 36 carbon atoms (such as 1,4-cyclohexane dimethanol and hydrogenated bisphenol A), adducts of cycloaliphatic diols described above with alkylene oxide(s) having 2 to 4 carbon atoms (such as ethylene oxide (EO), propylene oxide (PO), and butylene oxide (BO)) (1 to 30 moles of alkylene oxide(s) are added), adducts of bisphenols (such as bisphenol A, F and S) with alkylene oxide(s) having 2 to 4 carbon atoms (such as EO, PO and BO) (2 to 30 moles of alkylene oxide(s) are added).

Among these, preferred are alkylene glycols having 2 to 12 carbon atoms, adducts of bisphenols with alkylene oxide(s), and combinations thereof, more preferred are adducts of bisphenols with alkylene oxide(s), alkylene glycols having 2 to 4 carbon atoms, and combinations of two or more of these. In the present invention, the hydroxyl value and the acid value may be measured by a method defined by JIS K 0070.

Examples of the trivalent or more polyols (h), i.e. polyols having 3 to 8 valence or more, include those having a hydroxyl value of 150 mgKOH/g to 1900 mgKOH/g. Specific examples thereof include aliphatic polyvalent alcohols having 3 to 36 carbon atoms and 3 to 8 valences or more (such as alkane polyols and intra- or inter-molecular dehydration products thereof, for example, glycerin, triethylolethane, trimethylolpropane, pentaerythritol, sorbitol, sorbitan, polyglycerin and dipentaerythritol; saccharides and derivatives thereof, for example, simple sugar and methyl glucoside), adducts of aliphatic polyvalent alcohols with alkylene oxide(s) having 2 to 4 carbon atoms (such as EO, PO, and BO) (1 to 30 moles of alkylene oxide(s) are added), adducts of trisphenols (such as trisphenol PA) with alkylene oxide(s) having 2 to 4 carbon atoms (such as EO, PO, and BO) (2 to 30 moles of alkylene oxide(s) are added), and adducts of novolac resins (such as phenol novolacs and cresol novolacs having an average polymerization degree of 3 to 60) with alkylene oxide(s) having 2 to 4 carbon atoms (such as EO, PO, and BO) (2 to 30 moles of alkylene oxide(s) are added).

Among these, aliphatic polyvalent alcohols of 3 to 8 valences or more and adducts of novolac resins with alkylene oxide(s) (2 to 30 alkylene oxide(s) are added) are preferred, and adducts of novolac resins with alkylene oxide(s) (methylene oxide, ethylene oxide, propylene oxide, and butylene oxide) are more preferred.

Examples of the dicarboxylic acid (i) include those having an acid value of 180 mgKOH/g to 1250 mgKOH/g. Specific examples thereof include alkane dicarboxylic acids having 4 to 36 carbon atoms (such as succinic acid, adipic acid, and sebacic acid), alkenyl succinic acids having 4 to 36 carbon atoms (such as dodecenylsuccinic acid), cycloaliphatic dicarboxylic acids having 4 to 36 carbon atoms (such as dimer acids, for example, dimerized linoleic acid), alkene dicarboxylic acids having 4 to 36 carbon atoms (such as maleic acid, fumaric acid, citraconic acid, and mesaconic acid), and aromatic dicarboxylic acids having 8 to 36 carbon atoms (such as phthalic acid, isophthalic acid, terephthalic acid and derivatives thereof, and naphthalenedicarboxylic acid). Among these, preferred are alkene dicarboxylic acids having 4 to 20 carbon atoms and aromatic dicarboxylic acids having 8 to 20 carbon atoms. For the dicarboxylic acids (i), acid anhydrides or esters of lower alkyls (having 1 to 4 carbon atoms) (such as methyl esters, ethyl esters, and isopropyl esters) of those described above, may be used.

Examples of the trivalent or more polycarboxylic acids (j) (i.e. polycarboxylic acid having 3 to 6 valences or more) include those having an acid value of 150 mgKOH/g to 1250 mgKOH/g. Specific examples thereof include aromatic polycarboxylic acids having 9 to 20 carbon atoms (such as trimellitic acid and pyromellitic acid), and vinyl polymers of unsaturated carboxylic acids [having a number average molecular weight (Mn) of 450 to 10,000 determined by gel permeation chromatography (GPC)] (such as styrene/maleic acid copolymers, styrene/acrylic acid copolymers, α-olefin/maleic acid copolymers, and styrene/fumaric acid copolymers).

Among these, preferred are aromatic polycarboxylic acids having 9 to 20 carbon atoms, particularly preferred are trimellitic acid and pyromellitic acid. As the trivalent or more polycarboxylic acids (j), acid anhydrides or esters of lower alkyls (having 1 to 4 carbon atoms) (such as methyl esters, ethyl esters, and isopropyl esters) of those described above, may be used.

Along with the compounds diols (g), polyols (h), dicarboxylic acids (i) and polycarboxylic acids (j), aliphatic or aromatic hydroxycarboxylic acids (k) having 4 to 20 carbon atoms or lactones (l) having 6 to 12 carbon atoms may be copolymerized.

The hydroxycarboxylic acid (k) is exemplified by hydroxystearic acid and hardened castor oil fatty acids.

The lactone (l) is exemplified by caprolactone.

Examples of the polyepoxide (c) include polyglycidyl ethers [such as ethylene glycol diglycidyl ether, tetramethylene glycol diglycidyl ether, bisphenol A diglycidyl ether, bisphenol F diglycidyl ether, glycerin tridiglycidyl ether, pentaerythritol tetraglycidyl ether, and glycidyl-etherified phenol novolac (average polymerization degree: 3 to 60)], and diene oxides (such as pentadiene oxide and hexadiene oxide). Among these, polyglycidyl ethers are preferred, and ethylene glycol diglycidyl ether and bisphenol A diglycidyl ether are more preferred.

The number of epoxy groups is preferably 2 to 8 per molecule of the polyepoxide (c), more preferably 2 to 6, and particularly preferably 2 to 4. The epoxy equivalent of the polyepoxide (c) is preferably 50 to 500; more preferably, the lower limit is 70, particularly preferably 80; more preferably, the upper limit is 300, particularly preferably 200. When the number of epoxy groups and the epoxy equivalent are within the ranges mentioned above, appropriate developing ability as well as appropriate fixing property is provided. Further preferably, the number of epoxy groups per molecule and the epoxy equivalent are within the preferable ranges at the same time.

The reactant ratio of the polyol and the polycarboxylic acid is preferably 2/1 to 1/2 in terms of the equivalent ratio of hydroxyl group and carboxyl group [OH]/[COOH], more preferably 1.5/1 to 1/1.3, particularly preferably 1.3/1 to 1/1.2. The types of the polyol and the polycarboxylic acid are selected such that the glass transition temperature of the final preparation of the polyester toner binder is 45° C. to 85° C., and considering the molecular weights for adjustment.

With respect to the toner binder, a toner binder for full-color image and a toner binder for monochrome image are requested to have different physical properties, which also varies in the formulation of noncrystalline polyester resin. That is, since high glossiness is required, a low-viscosity binder needs to be used in full-color image. For monochrome image, because hot offset resistance is emphasized while glossiness is not particularly requested, a high-elastic modulus binder needs to be used.

The (AX1), the (AX2), and the (AY1) described above and combinations thereof are preferred in order to obtain highly glossy images suited for full-color copiers, etc. From the viewpoint that the polyester resin in this case preferably has lower viscosity, the ratio of the sum of molar amounts of polyols (h) and polycarboxylic acids (j) to the total of molar amounts of diols (g) to polycarboxylic acids (j) is preferably 0 mol % to 20 mol %, more preferably 0 mol % to 15 mol %, particularly preferably 0 mol % to 10 mol %.

The (AX2) and the (AY1) described above and combinations thereof are preferred in order to obtain high hot offset resistance suited for monochromic copiers, etc. From the viewpoint that the polyester resin in this case has preferably high elastic modulus, the noncrystalline polyester resin particularly preferably contains both of the polyols (h) and the polycarboxylic acids (j). The ratio of the sum of molar amounts of polyols (h) and polycarboxylic acids (j) to the total of molar amounts of diols (g) to polycarboxylic acids (j) is preferably 0.1 mol % to 40 mol %, more preferably 0.5 mol % to 25 mol %, particularly preferably 1 mol % to 20 mol %.

The amount of insoluble matter in tetrahydrofuran (THF) of noncrystalline polyester resins for full-color toner is 10% by mass or less in terms of glossiness, more preferably 5% by mass or less.

In the present invention, the unit of "%" means "% by mass", unless otherwise stated.

The amount of the insoluble matter or the soluble matter in THF can be determined by the following method. Namely, a sample of about 0.5 g is precisely weighed into a 200 mL Meyer flask with a stopper, to which 50 mL of THF (tetrahydrofuran) is added and the mixture is stirred under reflux for 3 hr, after the resultant mixture is cooled, the insoluble matter is filtered off using a glass filter. The rate of the amount of the THF insoluble matter (%) is calculated from the weight ratio of the resin matter remained on the glass filter which has been dried under reduced pressure at 80° C. for 3 hours against the sample. For the measurement of molecular weights described later, this filtrate is used as the THF soluble matter.

The storage elastic modulus of noncrystalline polyester resins at 100° C. is $10^3$ Pa to $10^6$ Pa, and preferably the storage elastic modulus at 150° C. is $10^2$ Pa to $10^4$ Pa. When the storage elastic modulus at 100° C. is $10^3$ Pa or more and the storage elastic modulus at 150° C. is $10^2$ Pa or more, heat resistant storage stability and hot-offset resistance become favorable. When the storage elastic modulus at 100° C. is $10^6$ Pa or less and the storage elastic modulus at 150° C. is $10^4$ Pa or less, low temperature-fixing property becomes favorable.

A method for determining the elastic modulus will be described below. Namely, a toner is formed into a pellet having a diameter of 20 mm and a thickness of 2.0 mm, and the pellet is set and measured on a parallel plate of a diameter of 20 mm using RHEOSTRESS RS50 manufactured by HAAKE Inc. The conditions for measurement are as follows. Sweeping sample temperature, frequency: 1 Hz (6.28 rad/s), temperature range: 80° C. to 210° C., strain: 0.1 (strain control), and rate of temperature increase: 2.5° C./min.

In the case of noncrystalline polyester resin for monochrome images, the amount of insoluble matter in THF is preferably 2% to 70%, more preferably 5% to 60%, and particularly preferably 10% to 50%. When the amount of insoluble matter in THF is 2% or more, hot-offset resistance becomes favorable. When the amount of insoluble matter in THF is 70% or less, favorable low temperature-fixing property can be obtained.

The softening point of the noncrystalline polyester reisn of the present invention is preferably 80° C. to 130° C., and more preferably 90° C. to 125° C. When the softening point is 80° C. or more, heat resistant storage stability and offset resistance become favorable. When the softening point is 125° C. or less, low temperature-fixing property becomes favorable.

A method for determining the softening points will be described below. Namely, the temperature of a sample material is raised at a constant rate using a flow tester under the conditions below, and the temperature at which half of the sample material having been flown out is defined as the softening point.

Apparatus: flow tester CTF-500D (manufactured by Shimadzu Co.)
Load: 20 kgf/cm$^2$
Die: 1 mm diameter −1 mm
Rate of temperature increase: 6° C./min
Sample mass: 1.0 g The peak top molecular weight (Mp) of the noncrystalline polyester resin is preferably 3,000 to 30,000, more preferably 1,500 to 25,000, and particularly preferably 1,800 to 20,000, for both of monochromic applications and full-color applications. When the peak top molecular weight (Mp) is 3,000 or more, heat resistant storage stability and powder flowability become favorable. When the peak top molecular weight (Mp) is 30,000 or less, low temperature-fixing property of toner becomes favorable.

The number average molecular weight (Mn) of the noncrystalline polyester resins is preferably 1,000 to 10,000, and more preferably 2,000 to 8,000. When the number average molecular weight (Mn) is 1,000 or more, heat resistant storage stability and offset resistance become favorable, when it is 8,000 or less, low temperature-fixing property becomes favorable.

Furthermore, the ratio of the weight average molecular weight (Mw) to the number average molecular weight (Mn) (Mw/Mn) is preferably 2 to 10, and more preferably 3 to 8. When the ratio (Mw/Mn) is 2 or more, a temperature range in which toner is fixable is obtained. When the ratio is 10 or less, low temperature-fixing property of toner becomes favorable.

The ratio of the amount of components having a molecular weight of 1,500 or less to the total amount of toner, when the toner has been produced using a toner binder (A) composed of the noncrystalline polyester resin, is preferably 1.8% or less, more preferably 1.3% or less, and particularly preferably 1.1% or less. When the ratio of the amount of components having a molecular weight of 1,500 or less is 1.8% or less, heat resistant storage stability becomes favorable.

In the present invention, Mp, Mn, and Mw of the noncrystalline polyester resins or the toner, and the ratio of components having a molecular weight of 1,500 or less may be determined using THF soluble matter by GPC under the following conditions.

Apparatus: HCL-8120, manufactured by Tosoh Corporation
Column: TSK GEL GMHXL (two)
TSK GEL MULTIPORE HXL-M (one)
Measuring temperature: 40° C.
Sample solution: 0.25% solution in THF
Amount of solution injected: 100 μl
Detecting device: refractive index detector
Standard substance: polystyrene A molecular weight of the peak which is the highest peak in a chromatogram obtained is referred to as a "peak top molecular weight (Mp)". Furthermore, the ratio of compounds having a molecular weight of 1,500 or less is calculated based on the proportional ratio of the peak area portions corresponding to compounds having a molecular weight of 1,500 or less to the entire peak areas.

The acid value of the noncrystalline polyester resins is preferably 0.2 mgKOH/g to 50 mgKOH/g, and more preferably 0.5 mgKOH/g to 40 mgKOH/g for both of monochrome applications and full-color applications. When the acid value is in the range of 0.2 mgKOH/g to 50 mgKOH/g, electrostatic chargeability is favorable.

The hydroxyl value of the noncrystalline polyester resin is preferably 1 mgKOH/g to 70 mgKOH/g, more preferably 3 mgKOH/g to 60 mgKOH/g, and particularly preferably 5 mgKOH/g to 55 mgKOH/g, for both of monochrome applications and full-color applications. When the hydroxyl value is in the range of 1 mgKOH/g to 70 mgKOH/g, environmental stability of the noncrystalline polyester resin is favorable. Methods for determining the acid value and the hydroxyl value are described below.

(Method for Determining Acid Value)

The acid value is determined in accordance with the measurement method described in JIS K0070-1992 under the following conditions.

Preparation of sample: Toner (0.5 g) (0.3 g of soluble components in ethyl acetate) is added to 120 ml of toluene and stirred for about 10 hr at room temperature (23° C.) to dissolve the toner in toluene. Further, 30 ml of ethanol is added to obtain a sample solution.

The acid value can be calculated with equipment described above, the acid value is specifically calculated as follows.

The sample solution is titrated with a standardized 0.1-N alcohol solution of potassium hydroxide, and the acid value is calculated from the consumed amount of the alcohol solution of potassium hydroxide in accordance with the following equation.

Acid value=[amount of *KOH* solution consumed (ml)]×*N*×56.1/[sample weight]

wherein N is a factor of 0.1×N.

(Method for Determining Hydroxyl Value)

A sample (0.5 g) is weighed out precisely and put into a 100-ml measuring flask, into which 5 ml of an acetylating reagent is precisely added. Subsequently the resultant mixture is heated in a bath at 100° C.±5° C. The measuring flask is removed from the bath after heating for 1 or 2 hours, cooled, then water is added into the measuring flask, and the flask is shaken to decompose acetic anhydride. In order to decompose acetic anhydride completely, the measuring flask is again heated in the bath for 10 min or more, and cooled, then the wall of the flask is sufficiently washed with an organic solvent. The resultant solution is titrated potentiometrically with a 0.5-N ethyl alcohol solution of potassium hydroxide using the electrode to calculate the hydroxyl value (in accordance with JIS K0070-1966).

The glass transition temperature (Tg) of the noncrystalline polyester resins is preferably 50° C. to 80° C., more preferably 55° C. to 75° C., for both of monochrome applications and full-color applications. When the Tg is in the range of 50° C. to 80° C., heat resistant storage stability and low temperature-fixing property are favorable.

In the present invention, the Tg of the noncrystalline polyester resins may be determined in accordance with a method defined in ASTM D3418-82 (DSC method) using DSC20, SSC/580 manufactured by Seiko Instruments Inc.

In the present invention the noncrystalline polyester resin used as the toner binder (A) may be produced by a method similar to the common method for producing noncrystalline polyester resin. For example, in an atmosphere of an inactive gas (such as nitrogen gas) and in the presence of a titanium-containing catalyst (a), noncrystalline polyester resin components are reacted at a temperature in the range preferably of 150° C. to 280° C., more preferably of 160° C. to 250° C., and particularly preferably 170° C. to 240° C. The length of time for reaction is, from the viewpoint of polycondensation reaction being surely carried out, preferably 30 min and more, and particularly preferably 2 hr to 40 hr. It is also effective to depressurize the reaction system (e.g. at 1 mmHg to 50 mmHg) to improve reaction rate at a final stage of the reaction.

The amount of the catalyst (a) to be added is, from the viewpoint of polymerization activity, 0.0001% to 0.8% against the weight of the polymers obtained, and more preferably 0.0002% to 0.6%, and particularly preferably 0.0015% to 0.55%.

The titanium-containing catalyst (a) may be combined with other esterification catalysts as long as it does not impair the catalytic effect of the catalyst (a). Examples of other esterification catalysts include tin-containing catalysts (such as dibutyltin oxide), antimony trioxide, titanium-containing catalysts other than the catalyst (a) (such as titanium alkoxides, potassium titanyl oxalate, and titanium terephthalate), zirconium-containing catalysts (such as zirconyl acetate), germanium-containing catalysts, alkaline (earth) metal catalysts (such as carboxylates of alkaline metals and alkaline earth metals, lithium acetate, sodium acetate, potassium acetate, calcium acetate, sodium benzoate, and potassium benzoate), and zinc acetate.

The amount of such other catalysts to be added is 0% to 0.6% (preferably more than 0% to 0.6%) against the weight of the polymers obtained. When the amount of other catalysts to be added is 0.6% or less, coloring of the noncrystalline polyester resins becomes less, thus the use of other catalyst in this range of the amount is suited for color toners. The amount of the catalyst (a) in the total amount of the catalysts added is preferably 50% to 100%.

An example of the method for producing a linear noncrystalline polyester resin (AX1) includes a method of heating a diol (g) and a dicarboxylic acid (i) at 180° C. to 260° C. to subject them to dehydration and condensation under normal and/or reduced pressures in the presence of a catalyst (a) of 0.0001% to 0.8% against the weight of the resulting polymers and other optional catalysts, thereby obtaining the (AX1).

Examples of the method for producing a nonlinear noncrystalline polyester resin (AX2) include a method of heating a diol (g), a dicarboxylic acid (i) and a trivalent or more polyol (h) at 180° C. to 260° C. to subject them to dehydration and condensation under normal and/or reduced pressures in the presence of a catalyst (a) of 0.0001% to 0.8% against the weight of the resulting polymers and other optional catalysts, further reacting them with a trivalent or more polycarboxylic acid (j), and thereby obtaining the (AX2). Note that in this method, the polycarboxylic acids (j) may be reacted with the diols (g), the dicarboxylic acids (i), and the polyols (h) at the same time.

Examples of the method for producing a modified noncrystalline polyester resin (AY1) include a method of adding a polyepoxide (c) to a noncrystalline polyester resin (AX2) and allowing a molecule-extending reaction of the polyester at 180° C. to 260° C., thereby obtaining the (AY1).

The acid value of (AX2) to react with polyepoxide (c) is preferably 1 mgKOH/g to 60 mgKOH/g, and more preferably 5 mgKOH/g to 50 mgKOH/g. When the acid value is 1 mgKOH/g or more, a possibility is eliminated that the polyepoxide (c) remains unreacted to degrade performance of resins. When the acid value is 60 mgKOH/g or less, thermal stability of the resin is favorable.

The amount of polyepoxide (c) to prepare the (AY1) is preferably 0.01% to 10% against the amount of the (AX2), more preferably 0.05% to 5%, from the viewpoint of low temperature-fixing property and hot-offset resistance.

[Synthesis of Crystalline Polyester Resin]

The crystalline polyester resin makes it possible to reduce the melt viscosity of the system of a toner obtained by using the crystalline polyester resin and to thereby improve adhesion properties to paper, etc. In addition, even when the crystalline polyester resin is contained in toner, the elastic modulus of the toner at higher temperatures is maintained in an appropriate range, leading to favorable offset resistance. Also in case of the crystalline polyester resin, when the melting point (softening point) is less than 80° C., storage stability degrades to cause problems in practical use, although fixing property is improved. On the other hand, when the melting point (softening point) of the crystalline polyester resin is more than 130° C., contribution of the crystalline polyester resin to the improvement in fixing property is reduced because of the increased melt initiation temperature, resulting in reduced effect of the crystalline polyester resin usage on improvement of fixing property. Note that the crystalline polyester resin having above effects is preferably used for the core portion of the core-shell structure in order to contribute to the improvement in fixing property and not to degrade storage stability.

In the present invention, an example of the crystalline polyester resin constituting a toner binder includes preferably polyester obtained by reacting an aliphatic diol with an aliphatic dicarboxylic acid (including acid anhydrides and acid chlorides).

Examples of a diol used for obtaining the crystalline polyester resin include ethylene glycol, diethylene glycol, triethylene glycol, 1,2-propylene glycol, 1,3-propylene glycol, 1,4-butanediol, 1,4-butenediol, neopentyl glycol, 1,5-pentane glycol, 1,6-hexane glycol, 1,4-cyclohexanediol, 1,4-cyclohexanedimethanol, dipropylene glycol, polyethylene glycol, polypropylene glycol, polytetramethylene glycol, bisphenol A, bisphenol Z, bisphenol F, and hydrogenated bisphenol A.

Examples of a dicarboxylic acid used for obtaining the crystalline polyester resin include oxalic acid, malonic acid, succinic acid, glutaric acid, adipic acid, pimelic acid, suberic acid, azelaic acid, sebacic acid, maleic acid, fumaric acid, citraconic acid, itaconic acid, glutaconic acid, n-dodecylsuccinic acid, n-dodecenylsuccinic acid, isododecylsuccinic acid, isododecenylsuccinic acid, n-octylsuccinic acid, n-octenylsuccinic acid, and acid anhydrides or acid chlorides thereof.

Examples of particularly preferred crystalline polyester resin include, polyester obtained by reacting 1,4-cyclohexanedimethanol with adipic acid, polyester obtained by reacting butanediol and ethylene glycol with adipic acid, polyester obtained by reacting 1,6-hexanediol with sebacic acid, polyester obtained by reacting ethylene glycol with succinic acid, polyester obtained by reacting ethylene glycol with sebacic acid, and polyester obtained by reacting 1,4-butanediol with succinic acid.

To adjust the relationship between the acid value and the hydroxyl value, a slightly excess amount of an alcohol component may be used for the adjustment. Namely, the relationship can be adjusted by using a slightly excess amount of an alcohol component, such as usage of an alcohol component and a carboxylic acid component in a molar ratio of the alcohol component to the carboxylic acid in the range of 1.01:1 to 1.10:1. The absolute acid value can be adjusted by monitoring the reaction with time and completing the polymerization reaction at the time when the acid value becomes within the range specified for this embodiment.

Preferred physical properties of the crystalline polyester resins of this embodiment will be described below. Note that the physical properties are determined in the same manner as for the noncrystalline polyester resin.

The softening point of the crystalline polyester reisn is preferably 80° C. to 130° C., and more preferably 90° C. to 125° C. When the softening point is 80° C. or more, heat resistant storage stability and offset resistance become favorable. When the softening point is 125° C. or less, low temperature-fixing property becomes favorable. Note that in case of the crystalline polyester resin, softening temperature is sometimes called as melting point, because as the temperature rises the viscoelasticity sharply decreases at a certain temperature (sharp melting).

The peak top molecular weight (Mp) of the crystalline polyester resin is preferably 3,000 to 30,000, more preferably 1,500 to 25,000, and particularly preferably 1,800 to 20,000, for both of monochrome applications and full-color applications. When the Mp is 3,000 or more, heat resistant storage stability and powder flowability become favorable. When the Mp is 30,000 or less, low temperature-fixing property of toner becomes favorable.

The number average molecular weight (Mn) of the crystalline polyester resin is preferably 1,000 to 10,000, and more preferably 2,000 to 8,000. When the Mn is 1,000 or more, heat resistant storage stability and offset resistance become favorable, when it is 8,000 or less, low temperature-fixing property of the toner becomes favorable.

Furthermore, the ratio of the weight average molecular weight (Mw) to the Mn (Mw/Mn) is preferably 2 to 10, and more preferably 3 to 8. When the ratio (Mw/Mn) is 2 or more, a temperature range in which toner is fixable is obtained. When the ratio is 10 or less, low temperature-fixing property of toner becomes favorable.

The ratio of the amount of components having a molecular weight of 1,500 or less to the total amount of toner, when the toner has been produced using a toner binder (B) composed of the crystalline polyester resin of this embodiment, is preferably 1.8% or less, more preferably 1.3% or less, and particularly preferably 1.1% or less. When the ratio of the amount of components having a molecular weight of 1,500 or less is 1.8% or less, heat resistant storage stability becomes favorable.

The acid value of the crystalline polyester resin is preferably 0.2 mgKOH/g to 50 mgKOH/g, and more preferably 0.5 mgKOH/g to 40 mgKOH/g for both of monochrome applications and full-color applications. When the acid value is in the range of 0.2 mgKOH/g to 50 mgKOH/g, electrostatic chargeability is favorable.

The hydroxyl value of the crystalline polyester resin is preferably 1 mgKOH/g to 70 mgKOH/g, more preferably 3 mgKOH/g to 60 mgKOH/g, and particularly preferably 5 mgKOH/g to 55 mgKOH/g, for both of monochrome applications and full-color applications. When the hydroxyl value is in the range of 1 mgKOH/g to 70 mgKOH/g, environmental stability of the crystalline polyester resin is favorable.

In the present invention, toner may contain the binder resin, a releasing agent, and a colorant, and may further contain as required additives such as a charge control agent, a fatty acid amide, and fine inorganic particles. The toner may be produced by a method of mechanically mixing in a dry state above mentioned toner materials, melting the mixture by heat, rolling, cooling, and pulverizing the heat-melted mixture, and classifying the pulverized product. Powders other than those adopted as raw materials for finished products in a pulverizing or classifying step (by-products) may be recycled in the step of mechanically mixing in a dry state or melting-kneading by heat.

The powders (by-product) other than those adopted as a direct material for finished products in pulverizing or classifying steps herein mean fine or coarse particles that are out of desirable particle diameters after a melt-kneading step followed by a pulverizing step or those that are out of desirable particle diameters after the following classifying step. It is preferred that such by-product is mixed with toner materials in a mixing ratio of 0 to 30 parts by mass of the by-product to 100 parts by mass of the principal toner materials in the step of mechanically mixing or the step of melting-kneading. Note that the by-product to be mixed may be in a state of fine particles or in a state of lumps. When the amount of the by-product to be mixed is more than 30 parts by mass to 100 parts by mass of the principal toner materials, heat properties of the principal toner materials are impaired, which sometimes harmfully influences fixing property or storage stability as toner.

The method for carrying out a step of mechanically mixing the toner components such as a binder resin, a colorant, a releasing agent, a charge control agent, a fatty acid amide, and fine inorganic particles and a step of mechanically mixing the toner components such as a by-product, a binder resin, a colorant, a releasing agent, a charge control agent, a fatty acid amide, and fine inorganic particles is not particularly limited and may be a method carried out under usual conditions using a conventional mixer with a rotatable blade. Note that the colorant may be used in a master batch.

After the above mentioned mixing step has been completed, the mixture is put into a kneader to be melted and kneaded. The melting kneader may be one-shaft or two-shaft continuous kneaders or batch kneaders with roll mills. Preferable examples thereof include KTK type two-shaft extruder (by Kobe Steel, Ltd.), TEM type extruder (by Toshiba Machine Co.), two-shaft extruder (by KCK Co.), PCM type two-shaft extruder (by Ikegai Ltd.), and Co-kneader (by Buss Co.). It is important that the melting-kneading step is carried out under appropriate conditions in which molecular chains of binder resins are not cut. Specifically, the melting-kneading temperature is adjusted considering the softening point of the binder resin. When the temperature is excessively lower than the softening point, molecular chains of binder resins are severely cut. When the temperature is excessively high, a charge control agent and a colorant are not sufficiently dispersed. Note that the particle diameter of the releasing agent can be controlled or adjusted by appropriately selecting the type of kneader and the conditions under which a kneader is operated.

The kneaded product is pulverized after the step of melting-kneading. Preferably, the material is roughly pulverized then finely pulverized in the step of pulverizing. Examples of preferred pulverizing methods include a method of making the materials collide with a plate by means of jet air, a method of making particles collide each other by means of jet air, and a method of pulverizing by use of a narrow gap between mechanically rotating rotors and stators. After the pulverizing step, the pulverized product is classified in an air flow by use of centrifugal force, thereby to produce a toner product having a predetermined particle diameter.

For producing toner of the present invention, in order to improve the flowability, storage stability, developing property, and transfer property of toner as a developer, fine inorganic particles such as fine hydrophobic silica powders are added and mixed to the toner base thus produced. The external additives are mixed using a common powder mixer, the mixer is preferably equipped with a jacket etc. to be able to adjust the inside temperature. The load history on the external additive may be changed by adding additional external additive in the course of addition or adding gradually increasing amount of the external additive. The load history on the external additive may be changed of course by changing rotation number, rolling rate, rolling time, temperature, etc. of the mixer. The load history may be a history with a high load applied in the initial period and then with a relatively weak load applied afterward, or vice versa.

Examples of the usable mixing equipment include V-type mixers, rocking mixers, Loedige mixers, Nauta mixers, and Henschel mixers.

On the other hand the electrostatic image developing toner according to this embodiment can be produced also via the step of aggregating polyester resin particles in an aqueous medium using a dispersion solution made by emulsifying and dispersing the polyester resin particles in the aqueous medium. It was found that the toner thus obtained can solve the above mentioned problems. Specifically, the toner particles can be obtained by a method of aggregating polyester resins, a releasing agent, a colorant, a fatty acid amide, and fine inorganic particles or by a method in which polyester resin particles containing a releasing agent, a fatty acid amide, and fine inorganic particles and polyester resin particles containing a colorant are separately prepared and they are aggregated.

A production method of the toner according to the present invention makes it possible to produce stably toner with small particle diameters and sharp particle size distribution advantageous for producing high quality images. Furthermore the production method also makes it possible to control, as required, reciprocal existing states of the resin, the releasing agent, the colorant, the fatty acid amide, and the fine inorganic particles and to bring out the property of the resins of the present invention effectively.

"To aggregate", as used herein, means a situation where at least a plurality of resin particles simply adhere to one another. By "aggregating", so called heteroaggregation particles (particle groups) are formed, in which composing particles are in contact with one another, however resin particles, and so forth are not fusion-bonded. The particle groups formed by "aggregating" are called, herein, as "aggregated particles."

Specific methods for producing the toner according to the present invention using emulsifying, dispersing, and aggregating steps are described herein.

(Emulsification Step)

An emulsified liquid according to the present invention is obtained by an emulsification step for emulsifying the polyester of this embodiment in an aqueous medium containing a basic substance. Emulsified particles (liquid drops) of the polyester resins described above are formed, in the emulsification step of the present invention, by giving shearing force to a mixture solution of an aqueous medium and a liquid containing the polyester resins (polymer liquid).

The emulsified particles (liquid drops) of the polyester resins are preferably formed, in the emulsification step of the present invention, by preparing a polymer (mixture) liquid through adding a colorant to the polymer liquid containing the polyester resins and by giving shearing force to the mixture solution of the aqueous medium and the polymer (mixture) liquid. In this way the emulsified liquid in which the colorant is dispersed can be prepared and used preferably for toner production.

At this moment, emulsified particles can also be formed by decreasing the viscosity of the polymer liquid through heating or dissolving the polyester resins in an organic solvent. Alternatively also a dispersing agent may be used for stabilization of the emulsified particles and thickening of the aqueous medium. On some occasions below, the dispersion containing such emulsified particles is called as "dispersion of resin particles".

Examples of the dispersing agent include water-soluble polymers such as polyvinyl alcohol, methylcellulose, ethylcellulose, hydroxyethyl cellulose, carboxymethyl cellulose, sodium polyacrylate, and sodium polymethacrylate; anionic surfactants such as sodium dodecylbenzenesulfonate, sodium octadecylsulfate, sodium oleate, sodium laurate, and potassium stearate; cationic surfactants such as laurylamine acetate, stearylamine acetate, and lauryltrimethylammonium chloride; zwitterionic surfactants such as lauryldimethylamineoxide; non-ionic surfactants, such as polyoxyethylene alkyl ether, polyoxyethylene alkylphenyl ether, and polyoxyethylene alkylamine; and inorganic compounds such as tricalcium phosphate, aluminum hydroxide, calcium sulfate, calcium carbonate, and barium carbonate.

When inorganic compounds are used as the dispersing agents, commercially available inorganic compounds may be directly used, or in order to obtain fine particles fine particles of inorganic compounds may be formed in the dispersing agent.

The amount of the dispersing agent used is preferably 0.01 parts by mass to 20 parts by mass per 100 parts by mass of the polyester resins (toner binder).

If a dicarboxylic acid having a sulfonate group is copolymerized in the polyester resin (preferably if an appropriate amount of components derived from the dicarboxylic acids having a sulfonate group is contained in the components derived from acids) in the emulsification step, the amount of a dispersion stabilizer such as a surfactant can be reduced. When the amount of the sulfonate group in the polyester resin is made larger, the emulsification becomes easier to perform, however, on some occasions electrostatic property, especially electrostatic property at high temperature and high-humidity conditions degrades. Thus it is preferable to design using as small amount of sulfonate group as possible for compositions. Alternatively there are also compositions capable of forming emulsified particles without using a sulfonate group.

The organic solvent can be suitably selected depending on the polyester resin used, and includes for example ethyl acetate and toluene.

The amount of the organic solvent used is preferably 50 parts by mass to 5,000 parts by mass, and more preferably 120 parts by mass to 1,000 parts by mass, per 100 parts by mass of the total amount of the polyester resins and other monomer used as required (on some occasions below they are referred to simply as "polymer").

When a colorant is used, the colorant may be mixed to the polyester resins before the emulsified particles are formed.

Usually when the polyester is emulsified directly, the pH of the emulsion becomes 3 to 4, and this too acidic pH makes the polyester to hydrolyze. However by adding a basic substance, pH of the pre-emulsified liquid at the time of emulsification is made neutral, which makes it possible to emulsify the polyester without causing hydrolysis and to obtain an emulsified liquid. The pH at the time of preparation of the emulsified liquid is preferably 4.5 to 9.5, and more preferably 5 to 9, and particularly preferably 6 to 8, from the viewpoint of prevention of hydrolysis of the polyester.

Examples of a basic substance according to the present invention include inorganic bases such as ammonia, sodium hydroxide, potassium hydroxide, sodium carbonate, potassium carbonate, sodium hydrogencarbonate, and potassium hydrogencarbonate; organic bases such as diethylamine and triethylamine. Among them inorganic bases are preferred and ammonia is particularly preferred.

Emulsion machines used in the emulsification step of the present invention include, for example, homogenizers, homomixers, clear mixes, pressure kneaders, extruders, and media dispersion machines.

The emulsified particles (liquid drops) of the polyester resins preferably have the average particle diameter (volume average particle diameter) of 0.01 μm to 1 μm, and more preferably have 0.03 μm to 0.8 μm, and particularly preferably have 0.03 μm to 0.4 μm.

A dispersing method of the colorant is not particularly limited; examples thereof include general dispersing methods such as methods using rotational shearing type homogenizers, and ball mills having medias, sand mills, dyno-mills, and rotor-stator type emulsion machines may be used.

As required, aqueous dispersion of these colorants using a surfactant and dispersion in an organic solvent of these colorants using a dispersing agent may be prepared. On some occasions below, such dispersion of the colorant is referred to as "dispersion of the colorant particles". For the surfactants and dispersing agents used in the dispersion, dispersing agents similar to those which may be used at the time of dispersion of the polyester resins may be used.

(Aggregation Step)

At the aggregation step, aggregates of emulsified particles are formed by heating and aggregating the emulsified particles thus obtained at a temperature near the melting point of the polyester resin but not higher than that melting point.

The aggregates of the emulsified particles are formed by adjusting the pH of the emulsified liquid to acidic while the emulsified liquid is stirred. The pH of the emulsified liquid for forming the aggregates is preferably 2 to 6, and more preferably 2.5 to 5, and particularly preferably 2.5 to 4. At this time a flocculant may be effectively used.

For the flocculant, in addition to surfactants which have a reverse polarity to the surfactants used for the dispersing agents and inorganic metal salts, divalent or more metal complexes can be suitably used. The metal complexes are particularly preferred because they can reduce the amount of a surfactant used and can improve charging characteristics.

Examples of the inorganic metal salts include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide. Among these, aluminum salts and polymers thereof are particularly preferred. In order to obtain sharper particle size distributions, for the valence of inorganic metal salt, divalence is preferred to monovalence, trivalence is preferred to divalence, and tetravalence is preferred to trivalence, for the type of the inorganic metal salt when the valence is the same, the polymer type, that is the inorganic metal salt polymer, is preferred to the monomer type.

(Unification Step)

At the unification step, progress of aggregation is stopped by adjusting pH of the suspension of the aggregates into the range of 3 to 10, while the suspension is stirred in the same way as the aggregation step, and the aggregates are each unified by heating at a temperature of the melting point of the polyester resins or higher. The temperature at which the aggregates are heated is a temperature of the melting point of the polyester resins or higher. The heating time is a time during which the unification is fully carried out, and may be about 0.5 hr to 10 hr.

From the particles obtained after the unification step, toner particles are produced through a solid-liquid separation step such as filtration, through a washing step as required, and through a drying step. In this case, the particles obtained after the solid-liquid separation step preferably are washed sufficiently at the washing step, in order to secure sufficient charging characteristics and reliability as toner.

At the drying step, any drying methods, such as a common vibration type fluidized drying method, a spray-drying method, a freeze-drying method, and a flash jet method can be adopted. The water content of the toner particles after the drying step is desirably adjusted to 1.0% or less, and preferably adjusted to 0.5% or less.

A toner particle according to the present invention preferably has core-shell structure, which makes improvement of fixing property and mechanical strength possible. In the following description of core-shell structure, the resin particles for cores are designated as (C) and the resin particles for shells are designated as (S).

The toner particle having the core-shell structure may be produced by a step for producing dispersion of the resin particles for cores (C), a step for producing dispersion of the resin particles for shells (S), a core particle forming step by aggregating or aggregating/fusion bonding the resin particles for cores (C) in an aqueous medium, and a shell layer forming step by attaching/fusion bonding at least the resin particles for shells (S) to surfaces of the core particles.

Latent electrostatic image developing toner according to the present invention contains toner particles having the core-shell structure obtained by attaching/fusion bonding resin particles for shells (S) to surfaces of core particles obtained by aggregating/fusion bonding at least resin particles for cores (C) in an aqueous medium.

In the present invention, for resin particles for shells (S) making up a shell layer on the surface of a core particle, a resin component softer than the resin particles for cores (C) and a resin component harder than the resin particles for cores (C) are used as essential components. By using the two resin components for resin particles for shells (S), the soft resin component acts as a fusion bonding enhancing component, can attach the hard resin component tightly on core particle surfaces and thus can form uniform shell layers, which makes toner particle surfaces smooth and produces uniform shell layers with high mechanical strength across the entire shell layers. Consequently, the toner structure having high durability against mechanical stresses in a developing device can be obtained.

In the present invention, the resin particles for cores may be particles containing different resin components as separate particles, or may be composites particles containing in one particle different resin components as unique resin layers.

Similarly, in the present invention the resin particles for shells may be particles containing different resin components as separate particles, or may be composites particles containing in one particle different resin components as unique resin layers.

<Core Particle>

The resin particles for cores (C) may be composed not only of a single type of resin particle, but also of a plurality of resin particles of different molecular weights, such as high molecular weight resin particles for cores C1, intermediate molecular weight resin particles for cores C2, and low molecular weight resin particles for cores C3, or may be resin particles (composite resin particles) multi-stratified (complexed) with resins of different molecular weights such as resins for cores C1, C2, and C3 by multistage polymerization. Thus the core particles can be obtained by aggregating or fusion bonding a plurality of resin particles of different molecular weights and colorant particles, etc. as desired, or by aggregating or fusion bonding composite resin particles and colorant particles, etc. as desired.

The number average molecular weight (Mn) of resins over the total core particles are preferably 1,000 to 10,000, and more preferably 2,000 to 8,000. When the Mn is 1,000 or more, the heat resistance/storage stability and offset resistance become favorable, when the Mn is 8,000 or less, the low temperature-fixing property of the toner becomes favorable. When the number average molecular weight (Mn) is above 10,000, the fixing property sometimes becomes insufficient, when the number average molecular weight is less than 1,000, the blocking ability and storage stability of the toner sometimes degrade.

The resin particles for cores (C) are not particularly limited as far as they are resin particles capable of being stably dispersed in an aqueous medium. For the resin particles for cores (C), known resin composition systems and production methods are applicable, and a styrene-acrylic copolymer resins and polyester resins are suitably used in terms of the fixing property and storage stability of the toner.

For the method for producing the styrene-acrylic copolymer resin, emulsification polymerization or suspension polymerization are appropriate. The polyester resin particles are easily obtained by dissolving previously given polymers in a solvent and suspending, emulsifying and dispersing the resultant solution in an aqueous medium. In particular when the low molecular weight component, high molecular weight component and intermediate molecular weight component are contained in a composite, resin particles obtained via multistage polymerization by the emulsification polymerization method is appropriate in terms of manufacturing efficiency.

The resin particles for cores (C) preferably have a weight average particle diameter of 50 nm to 500 nm. For determination of the particle diameters of the resin particles for cores (C), resin particles for shells (S) described below, wax dispersion described below and colorant dispersion, for example, a dynamic light scattering type particle size distribution analyzer (MICROTRAC UPA150, manufactured by Honeywell International Inc.) may be used.

<Shell Layer>

The weight average molecular weight of resin particles for shells (S) making up the shell layer (MwS) is in the range satisfying the following expression (i) with respect to the weight average molecular weight of resin particles for cores (C) (MwC).

$$MwC<MwS \qquad (i)$$

The weight average molecular weight of the resin particles for shells (S) (MwS) is preferably 10,000 to 100,000. When the MwS is MwC or less, stress resistance sometimes degrades.

In the present invention, the resin particles for shells (S) are preferably composed of resin component S1 that is softer than the resin particles for cores (C) and resin component S2 that is harder than the resin particles for cores (C).

The resin component S1 is preferably a resin which has a smaller molecular weight (MwS1) than the resin particles for cores (C) have (MwC) and has a glass transition temperature of 50° C. to 80° C.

The resin component S2 is more preferably a resin which has a larger molecular weight (MwS2) than the resin particles for cores (C) have (MwC) and has a glass transition temperature of 50° C. to 80° C.

More specifically, the resin component S1 or S2 making up the resin particles for shells (S) is preferably a resin satisfying the following expression (ii) for each and having the respective glass transition temperature for each.

$$MwS1<MwC<MwS2 \qquad (ii)$$

wherein the MwS1 and MwS2 represent the weight average molecular weight of the resin component S1 and S2, respectively.

Thus, the MwS of the total resin particles for shells (S) composed of the resin component S1 and resin component S2 satisfying the expression (ii) is required to satisfy the expression (i).

The resin particles for shells (S) may be particles containing the resin component S1 and resin component S2 as separate particles, or may be composite particles having in one particle the resin component S1 and resin component S2 as unique layers. The latter configuration is so-called composite resin particles obtained for example by multi-stratifying (complexing) using multistage polymerization method. Specifically each composite particle has resin layers of the resin component S1 and resin component S2 that respectively satisfy their molecular weight ranges. In this case, resin component S2 particles are more preferably coated (encapsulated) by the resin component S1, in terms of uniformity of shell layers and improvement of film forming ability.

Whether the resin particle for shells (S) has a particle composition containing separate particles each belonging to any one of the resin component S1 and resin component S2, or a composite particle composition, toner particles with smooth surfaces can be obtained by containing the low molecular weight resin component S1 in the resin particle for shells (S), which makes the resin particle for shells (S) excellent in fusion bonding ability and film forming ability onto the core particle surfaces. Furthermore, the resin particle for shells (S) produces high mechanical strength by containing the resin component S2. By containing a combination of the resin components S1 and S2, it is designed so that the degree of hardness of the total shell layer is increased and loss of interfaces in the shells and smooth surfaces of the toner particles are produced, resulting in remarkably enhanced stress resistance of the toner particles. When the resin component S2 is not contained or the resin component S2 with MwS2 smaller than MwC is contained, stress resistance degrades and fragmented toner particles are produced. Furthermore when the resin component S1 is not contained or the resin component S1 with MwS1 larger than MwC is contained, the resin particle for shells (S) cannot effectively adhere to core particle surfaces, which prevents formation of mechanically strong, uniform shell layers with smooth surfaces, resulting in degradation of stress resistance.

The weight average molecular weight of the resin component S1 (MwS1) is preferably 5,000 to 30,000, and more preferably 7,000 to 20,000, in terms of effectiveness of fusion-bonding ability and film forming ability of the resin particle for shells (S).

The weight average molecular weight of the resin component S2 (MwS2) is preferably 10,000 to 100,000, and more preferably 30,000 to 100,000, in terms of effective formation of harder shell layers.

The amount of the resin component S1 is preferably 5% to 65%, and more preferably 10% to 40% based on the total amount of the resin particles for shells (S). Meanwhile, the amount of the resin component S2 is preferably 35% to 95%, and more preferably 60% to 90% based on the total amount of the resin particles for shells (S). For the resin particle for shells (S), functional materials can be used that are different from the resin components S1 and S2 and are effective in chargeability and fixing property of the toner.

The resin particles for shells (S) are not particularly limited so far as they are resin particles capable of being stably dispersed in an aqueous medium, and for which known resin composition system and production method are applicable. For the resin component S1, styrene-acrylic type copolymer resins or polyester type resins of relatively low molecular weights are appropriately used in terms of fusion bonding and film forming ability of the shell layers. For the resin component S2, styrene-acrylic copolymer resins or polyester resins of relatively high molecular weights are appropriately used in terms of strength of the shell layers. For the resin component S2, as a resin composition system excellent in mechanical strength, a high molecular weight polymers of polyester resin and polyester prepolymers elongated by urethane is appropriately used, which may contain cross-linking structure in order further to increase the strength.

For the resin components S1 and S2 together with the resin particle for cores (C), material systems appropriate for the developing system and fixing system may be suitably selected. As specific examples of combinations of the resin particle for cores (C), resin component S1 and resin component S2, (11) Pes-StAc-Pes, (12) Pes-StAc-Pes, (13) Pes-Pes-StAc, and (14) Pes-Pes-Pes can be included, wherein "StAc" represents styrene-acrylic resin, and "Pes" represents polyester resin.

At least one of the resin component S1 or the resin component S2 is preferably a polyester resin in terms of further improvement of stress resistance. Examples of such combinations of the resin particle for cores (C), resin component S1, and resin component S2 include the above combinations of (12), (13), and (14). The combinations of (12) and (14) with the resin component S2 being polyester resin are particularly preferred from the above mentioned viewpoint.

<Mixing Mass Ratio of Resin Particle for Cores (C) and Resin Particle for Shells (S)>

The mixing mass ratio (core:shell) of the resin particles for cores (C) making up the core particles and the resin particles for shells (S) making up the shell layers is preferably 50:50 to 90:10. When the amount of resin particles for shell layers is too small compared to the amount of resin particles for cores, the toner mechanical strength by the shell layer is not improved. On the other hand, when the amount of resin particles for shells (S) is too large relative to the amount of resin particles for cores, the temperature at which the toner particles are fixed sometimes becomes too high.

In the present invention, the weight average particle diameter ($D_4$) of the toner is preferably 3.0 μm to 10.0 μm, and more preferably 3.5 μm to 7.0 μm. The ratio of the $D_4$ and the number average particle diameter (Dn) ($D_4$/Dn) is preferably 1.05 to 1.30. The above ranges of $D_4$ and $D_4$/Dn are preferred in terms of high quality of print images and quality stability.

When the weight average particle diameter ($D_4$) is 3.0 μm or more, cleaning ability of the residual toner particles left on the surface of the image bearing member becomes excellent, and when the weight average particle diameter is 10.0 μm or less, dot reproducibility and granularity of the print images and fixing property become excellent.

When the ratio $D_4$/Dn is 1.05 or more, stable toner preparation becomes possible, and when the ratio is 1.30 or less, dot reproducibility and granularity of the print images become excellent at the same time that occurrence of abnormal images such as background fogging of images can be prevented.

These properties on the particle diameter of toner are determined as follows.

As a measurement device for toner particle size distribution, COULTER MULTISIZER II (manufactured by Coulter Company Limited) is used. A measurement method is described below.

First, to 100 ml to 150 ml of an aqueous electrolyte solution, 0.1 ml to 5 ml of a surfactant (preferably an alkylbenzene sulfonate salt) is added as a dispersing agent. Where the electrolyte solution is an aqueous solution of about 1% NaCl using first-grade sodium chloride, and may be for example Isoton-II (manufactured by Coulter Company Limited). The sample for measurement (2 mg to 20 mg) is further added. The electrolyte solution in which the sample is suspended is subjected to dispersion treatment for about 1 min to 3 min by an ultrasonic dispersion device. Volumes and numbers of toner particles or toner are determined by the measurement device using a 100 μm aperture as an aperture, and volume distribution and number distribution are calculated. From the distributions thus produced, the weight average particle diameter ($D_4$) and the number average particle diameter (Dn) of the toner can be obtained.

As channels, 13 channels were used, that is, channels of sizes of 2.00 μm to less than 2.52 μm; 2.52 μm to less than 3.17 μm; 3.17 μm to less than 4.00 μm; 4.00 μm to less than 5.04 μm; 5.04 μm to less than 6.35 μm; 6.35 μm to less than 8.00 μm; 8.00 μm to less than 10.08 μm; 10.08 μm to less than 12.7 μm; 12.70 μm to less than 16.00 μm; 16.00 μm to less than 20.20 μm; 20.20 μm to less than 25.40 μm; 25.40 μm to less than 32.00 μm; 32.00 μm to less than 40.30 μm; and thus particles of diameter of 2.00 μm to less than 40.30 μm were covered for the measurement.

The average circularity of the toner is preferably 0.90 to 0.99, and more preferably 0.94 to 0.98. When the average circularity is 0.90 or higher, transfer efficiency in primary transfer from the latent electrostatic image bearing member to a sheet of transfer paper or to the intermediate transfer member or in secondary transfer from the intermediate transfer member to a sheet of transfer paper becomes excellent. When the average circularity is 0.99 or lower, cleaning ability of the residual toner particles remained on the surface of the latent electrostatic image bearing member becomes excellent.

As for the circularity of the toner, 50% or more of particles preferably have circularity in the range of 0.93 to 0.97. In this case both of the transfer efficiency and the cleaning ability become excellent.

The circularity of the toner may be determined as follows.

In the present invention, ultrafine powder toner is injected into a flow type particle image analyzer ("FPIA-2100" manufactured by SYSMEX Corp.) for analysis by analysis software (FPIA-2100 Data Processing Program for FPIA version 00-10). Specifically into a 100 ml glass beaker, 0.1 ml to 0.5 ml of a 10% surfactant (an alkylbenzene sulfonate salt, NEOGEN SC-A; manufactured by Dai-ichi Kogyo Seiyaku Co., Ltd.) was added, 0.1 g to 0.5 g of each toner was added and agitated by a micro spatula, and then to the resultant mixture 80 ml of ion-exchange water was added. The dispersion thus obtained was subjected to 3-min dispersion treatment using an ultrasonic dispersing device (manufactured by HONDA ELECTRONICS CO., LTD). The dispersion concentration was made 5,000 particles/μl to 15,000 particles/μl, and the shape and the distribution of the toner are determined using the FPIA-2100. It is important in this measurement method to adjust the dispersion concentration in the range of 5,000 particles/μl to 15,000 particles/μl for measurement in terms of measurement reproducibility of the average circularity. It is necessary to alter the conditions of the dispersion, that is, the amount of the surfactant added and the amount of the toner, in order to obtain the dispersion concentrations in that range. As with measurement of toner particle diameters as described above, the required amount of the surfactant depends on hydrophobicity of the toner. When an excess amount of the surfactant is added, noises due to bubbles are caused, and when an insufficient amount of the surfactant is used, the toner particles fail to be wetted sufficiently, resulting in insufficient dispersion. The amount of the toner to be added depends on the particle diameters of toner, is required to be small when the particle diameters are small, and is required to be large when the particle diameters are large. When the toner particle diameters are 3 μm to 7 μm, a dispersion concentration in the range of 5,000 particles/μl to 15,000 particles/μl can be obtained by adjusting the toner amount to be added to 0.1 g to 0.5 g.

Furthermore, in addition to the above mentioned polycondensation polyester resins other resins may be contained in a toner binder (A) of the present invention as required.

Examples of other resins include styrene resins (such as copolymers of styrene and an alkyl(meth)acrylate, and copolymers of styrene and a diene monomer), epoxy resins (such as open circular polymers of bisphenol A diglycidyl ether), urethane resins (such as polyaddition polymers of a diol and/or a trivalent or more polyol and diisocyanate).

The weight average molecular weights of other resins are preferably 1,000 to 2,000,000.

The amount of other resin in the toner binder (A) is preferably 0% to 40%, more preferably 0% to 30%, and particularly preferably 0% to 20%.

In these cases, the toner binder may be previously powder-mixed or melt mixed, or may be mixed at the time of toner formation.

The temperature at which the toner binder is melt mixed is preferably 80° C. to 180° C., more preferably 100° C. to 170° C., and particularly preferably 120° C. to 160° C.

When the mixing temperature is too low, the toner binder is sometimes insufficiently and unevenly mixed. When more than one type of polyester resins are mixed and the mixing temperature is too high, sometimes resin physical properties necessary for a toner binder cannot be maintained, because averaging, etc. due to an ester exchange reaction happens.

The length of time for melt mixing is preferably 10 sec to 30 min, more preferably 20 sec to 10 min, and particularly preferably 30 sec to 5 min. When more than one type of polyester resins are mixed and the length of time for mixing is too long, sometimes resin physical properties necessary for a toner binder cannot be maintained, because averaging, etc. due to an ester exchange reaction happens.

Examples of a mixing device for melt mixing include a batch-wise mixing device such as a reaction vessel, and a continuous mixing device. For mixing uniformly in a short time at a proper temperature, the continuous mixing device is preferred. Examples of the continuous mixing device include extruders, continuous kneaders, and three roll mixing devices. Among these, extruders and continuous kneaders are preferred.

Under common mixing conditions and using a common mixing device, the toner binder can be powder-mixed.

As for the powder-mixing conditions, the mixing temperature is preferably 0° C. to 80° C., and more preferably 10° C. to 60° C. The length of time for mixing is preferably 3 min or more, and more preferably 5 min to 60 min. Examples of the powder-mixing device include Henschel mixers, Nauta mixers, and BANBURY mixers. Among these, Henschel mixers are preferred.

An electrostatic image developing toner of the present invention is composed of a toner binder, a releasing agent, and a fatty acid amide according to the present invention, and fine inorganic particles and a colorant, and contains as required various additives such as a charge control agent and a fluidizer.

The amount of the toner binder in the toner is, when dyes or pigments are used as colorants, preferably 70% to 98%, and more preferably 74% to 96%, and when magnetic powders are used as colorants, the amount of the toner binder in the toner is preferably 20% to 85%, and more preferably 35% to 65%.

For the colorant known dyes, pigments and magnetic powders may be used. Specific examples thereof include carbon black, Sudan black SM, First yellow G, Benzidine yellow, Pigment yellow, India first orange, lrgasine red, Baranito aniline red, Toluidine red, Carmine FB, Pigment orange R, Raykired 2G, Rodamine FB, Rodamine B rake, Methylviolette B rake, Phthalocyanine blue, Pigment blue, Brilliant green, Phthalocyanine green, Oil yellow GG, Kayaset YG, Orasol brown B, Oil pink OP, magnetite, and iron black.

The amount of the colorant in the toner is, when a dye or pigment is used, preferably 2% to 15%. The amount is, when a magnetic powder is used, preferably 15% to 70%, and more preferably 30% to 60%.

The average dispersion particle diameter of a pigment inside the toner particle of the present invention is preferably 0.05 μm to 0.50 μm, and more preferably 0.10 μm to 0.40 μm. When the average dispersion particle diameter of the pigment is 0.05 μm or more, stable production of the toner becomes possible. When the average dispersion particle diameter of the pigment is 0.50 μm or less, coloring ability of the toner is improved, and in a color toner color reproduction spectrum is improved.

In the present invention, the dispersion diameter is defined as the diameter of the pigment which is the maximum length for the pigment. Specifically, toner particles were embedded in an epoxy resin and sliced as ultrathin sections of about 100 μm thickness, the cross-sectional surface of the toner particle was observed with a transmission electron microscope (TEM) at a magnification of ×10,000 and photographed for 20 toner particles. By evaluating the images of the resultant 20 photographs, the dispersing states of the wax were observed and the dispersion diameters were determined. When the toner particle took an infinite shape, the average value of the maximum diameter and the minimum diameter was taken as a dispersion diameter.

Examples of the releasing agent of the present invention include carnauba wax (C1), Fischer-Tropsh wax (C2), paraffin wax (C3), and polyolefin wax (C4).

Examples of the (C1) include natural carnauba wax, and free-fatty acid-removed carnauba wax.

Examples of the (C2) include petroleum-based Fischer-Tropsh wax (for example PARAFLINT H1, PARAFLINT H1N4, and PARAFLINT C105 manufactured by SCHUMANN SASOL GmbH & CO. KG.), natural gas-based Fischer-Tropsh wax (for example FT100 manufactured by Shell MDS), and purified products of these Fischer-Tropsh wax by such a method as fractionated crystallization (for example MDP-7000 and MDP 7010 manufactured by NIPPON SEIRO CO., LTD.).

An example of the (C3) includes petroleum wax-based paraffin wax (for example, paraffin wax HNP-5, paraffin wax HNP-9, and paraffin wax HNP-11 manufactured by NIPPON SEIRO CO., LTD.).

Examples of the (C4) include polyethylene wax (for example SANWAX 171P and SANWAX LEL400P manufactured by Sanyo Chemical Industries, Ltd.) and polypropylene wax (for example VISCOL 550P and VISCOL 660P manufactured by Sanyo Chemical Industries, Ltd.).

Among these wax, carnauba wax and Fischer-Tropsh wax are preferred, and carnauba wax and petroleum-based Fischer-Tropsh wax are more preferred. By using these wax as releasing agents for toners, the toner with excellent low temperature-fixing property can be obtained.

The amount of the releasing agent in the toner is preferably 0% to 10%, and more preferably 1% to 7%.

The average dispersion particle diameter of the releasing agent inside the toner particles of the present invention is preferably 0.2 μm to 2.0 μm, and more preferably 0.3 μm to 1.5 μm.

When the average dispersion particle diameter of the releasing agents is 0.2 μm or more, the releasing agent becomes easy to exude on the toner surfaces at the time of fixation, and even in a fixing device which does not apply fixing oil, produces sufficient fixing and releasing ability. When the average dispersion particle diameter of the releasing agents is 2.0 μm or less, releasing agents having low heat resistance exude on the toner surfaces by stirring the toner particles in a developing device, which tends to cause a phenomenon called filming where toner particles fuse to carrier surfaces and various members in the developing device.

The average dispersion diameters of the releasing agents are determined as follows. In the present invention, the wax dispersion diameter is defined as the particle diameter of the wax which is the maximum length for the wax. Specifically, toner particles were embedded in an epoxy resin and sliced as ultrathin sections of about 100 μm thickness, stained with ruthenium tetroxide, then the cross-sectional surfaces of the toner particles were observed using a transmission electron microscope (TEM) at a magnification of ×10,000 and photographed for 20 toner particles. By evaluating the images of the resultant 20 photographs, the dispersing states of wax were observed and their dispersion diameters were determined. When the wax took an infinite form, the average value of the maximum diameter and the minimum diameter was taken as a dispersion diameter.

The amount of the releasing agent in the vicinity of surfaces of toner particles ([amount of releasing agent]/([amount of releasing agent]+[amount of resin])) is preferably 0.5% to 10%, more preferably 1.0% to 9.0%. When the amount of the releasing agent in the vicinity of the surfaces of toner particles is 0.5% or more, toner containing the releasing agent can be stably prepared. When the amount is 10.0% or less, it becomes possible to prevent filming of the toner on surfaces of carriers and on various members in a developing unit.

The amount of the releasing agent is calculated from the intensity ratio of the binder resin and the releasing agent using an FTIR-ATR (Fourier-transform Infrared-Attenuated Total Reflectance) method. The range in depth analyzed by a FTIR-ATR method is, from the measurement principle, from the surface to about 0.3 μm in depth, and thus by this method the relative amount of the releasing agent contained in the range from the surface to the 0.3 μm in depth of the toner particle can be determined. The measurement method is as follows. First, a binder resin and wax are mixed using an agate mortar, 3 g of the mixture as a sample is quantified and subjected to one-min pressing with a 6-t load using an automatic briquetting press (TYPE M No. 50 BRP-E manufactured by MAEKAWA TESTING MACHINE MFG. Co., Ltd.) to prepare a pellet of 40 mm in diameter (and about 2 mm in thickness). A surface of the toner pellet is measured by a FTIR-ATR method. A microscopic FTIR apparatus used is SPECTRUM ONE (manufactured by Perkin Elmer Japan Co., Ltd.) equipped with MULTISCOPE FTIR UNIT using micro ATR of a germanium (Ge) crystal of 100 μm in diameter. The measurement is carried with an incident light angle of an infrared ray at 41.5°, resolution of 4 $cm^{-1}$, and number of accumulated measurements of 20.

The fatty acid amide compound is preferably a compound represented by $R^1$—CO—$NR^2R^3$. In the chemical formula, R1 represents an aliphatic hydrocarbon group having 10 to 30 carbon atoms, $R^2$ and $R^3$ independently represent a hydrogen atom, an alkyl group having 1 to 10 carbon atoms, an aryl group having 6 to 10 carbon atoms, and an aralkyl group having 7 to 10 carbon atoms. Here, the alkyl group, the aryl group, and the aralkyl group of $R^2$ and $R^3$ may be substituted with an ordinary inactive group such as a fluorine atom, a chlorine atom, a cyano group, an alkoxy group, an alkylthio group, however, are preferably substituted with none.

Preferred examples of the fatty acid amide compound include stearic acid amide, stearic acid methylamide, stearic acid diethylamide, stearic acid benzylamide, stearic acid phenylamide, behenic acid amide, behenic acid dimethylamide, myristic acid amide, and palmitic acid amide.

In the present invention, among the fatty acid amide compounds, alkylenebis fatty acid amide is particularly preferably used. Examples of the alkylenebis fatty acid amide include methylenebis stearic acid amide, ethylenebis stearic acid amide, methylenebis palmitic acid amide, ethylenebis palmitic acid amide, methylenebis behenic acid amide, ethylenebis behenic acid amide, hexamethylenebis stearic acid amide, hexaethylenebis palmitic acid amide, and hexamethylenebis behenic acid amide. Among these, ethylenebis stearic acid amide is particularly preferred.

Examples of usable alkylenebis fatty acid amide type compound other than those mentioned above include alkylenebis fatty acid amide type compounds of saturated fatty acids or unsaturated fatty acids with 1 or 2 valence such as propylenebis stearic acid amide, butylenebis stearic acid amide, methylenebis oleic acid amide, ethylenebis oleic acid amide, propylenebis oleic acid amide, butylenebis oleic acid amide, methylenebis lauric acid amide, ethylenebis lauric acid amide, propylenebis lauric acid amide, butylenebis lauric acid amide, methylenebis myristic acid amide, ethylenebis myristic acid amide, propylenebis myristic acid amide, butylenebis myristic acid amide, propylenebis palmitic acid amide, butylenebis palmitic acid amide, methylenebis palmitoleic acid amide, ethylenebis palmitoleic acid amide, propylenebis palmitoleic acid amide, butylenebis palmitoleic acid amide, methylenebis arachidic acid amide, ethylenebis arachidic acid amide, propylenebis arachidic acid amide, butylenebis arachidic acid amide, methylenebis eicosenoic acid amide, ethylenebis eicosenoic acid amide, propylenebis eicosenoic acid amide, butylenebis eicosenoic acid amide, methylenebis behenic acid amide, ethylenebis behenic acid amide, propylenebis behenic acid amide, butylenebis behenic acid amide, methylenebis erucic acid amide, ethylenebis erucic acid amide, propylenebis erucic acid amide, and butylenebis erucic acid amide.

The fine inorganic particles are not particularly limited, can be appropriately selected depending on the purpose, and include for example silica, alumina, titanium oxide, barium titanate, magnesium titanate, calcium titanate, strontium titanate, zinc oxide, tin oxide, silica sand, clay, mica, tabular spar, diatom earth, chromium oxide, cerium oxide, colcothar, antimony trioxide, magnesium oxide, zirconium oxide, barium sulfate, barium carbonate, calcium carbonate, silicon carbide, and silicon nitride. Among these, silica is preferred in that it does not impair the transparency of toner and gives toner of excellent coloring.

The average primary particle diameter of the fine inorganic particles is about 60 nm to 150 nm, and preferably 70 nm to 130 nm.

The above mentioned fatty acid amide and fine inorganic particles, when they are contained in crystalline polyester resin (B), promote crystallization by forming nuclei for the crystallization of the crystalline polyester resin (B), improve low temperature-fixing property by sharply melting with temperature, as well as improve heat resistant storage stability by preventing reciprocal dissolving of resins or resin and the releasing agent.

The amount of fatty acid amide and fine inorganic particles in toner is preferably 0% to 10%, and more preferably 0.01% to 6%. It is possible for fatty acid amide and fine inorganic particles to be aggregated as the same time as resins and so forth and be dispersed in toner or to be contained inside the resins and so forth.

Examples of the charge control agent include nigrosine dyes, quaternary ammonium salt compounds, quaternary ammonium base-containing polymers, metal-containing azo dyes, salicylic acid metal salts, sulfonic acid group-containing polymers, fluorine-containing polymers (fluorine-modified polymers) and halogen-substituted aromatic ring-containing polymers.

The amount of the charge control agent in the toner is preferably 0% to 5%, and more preferably 0.01% to 4%. The charge control agent can be, as required, put in a state where the charge control agents are aggregated as the same time as a resin and so forth and are dispersed in the toner, or in another state where they adhere to the toner surfaces.

An external additive made of fine inorganic particles are preferably attached to surfaces of toner particles, wherein the fine inorganic particles preferably contain fine silica particles having a degree of hydrophobizing of 50% or more and a BET specific surface area of 100 $m^2/g$ to 300 $m^2/g$ and fine titania particles having a degree of hydrophobizing of 50% or more and a BET specific surface area of 20 $m^2/g$ to 150 $m^2/g$.

By combining the silica particles and the titania particles for external addition to the toner as an external additive, properties required for the toner are effectively obtained. Although the silica particles have an advantage of improving flowability of the toner, they have disadvantages of increasing extremely the charge amount of the toner or increasing environmental dependency of the charge amount of the toner. On the other hand, though the titania particles do not improve flowability of the toner to such a degree as the silica particles do, they cause less increase of the charge amount and have less environmental dependency, compared to the silica particles.

By setting the degree of hydrophobizing as 50% or more for both external additives, hydrophobic property of the toner is improved, and the environmental dependency of the electrostatic property and flowability of the toner can be reduced.

By setting the BET specific surface area as 100 $m^2/g$ or larger for silica particles, decrease of flowability caused by embedding into the toner particles the silica adhered to toner surfaces by stirring in a developing device is suppressed. By setting the BET specific surface area as 300 $m^2/g$ or smaller, sufficient flowability is given to the toner.

By setting the BET specific surface area as 20 $m^2/g$ or larger for titania particles and by embedding into the toner particles the titania particles adhered to the toner surface by stirring in a developing device, changes in the electrostatic property are suppressed. By setting the BET specific surface area as 150 $m^2/g$ or smaller, sufficient flowability is given to the toner.

Examples of other fluidizer include known fluidizers such as alumina powder and calcium carbonate powder. The amount of the fluidizer in toner is preferably 0.1% to 5%.

As the external additive, fine silica particles having an average primary particle diameter of 60 nm to 150 nm and approximately spherical shapes are preferably used. Such fine silica particles as above act as rollers on the toner surfaces for the toner to move easily, give excellent cleaning ability, and particularly when toners of small particle diameters achieving high image quality are used, the degradation of developing ability and transfer efficiency is improved.

The average primary particle diameter (hereinafter referred to as "average particle diameter") of the fine silica particles is preferably 60 nm to 150 nm, and particularly preferably 70 nm to 130 nm. When the average particle diameter is less than 60 nm, fine silica particles are sometimes embedded in concave parts of a toner surface and do not act as rollers for the toner particles as efficiently as when the average primary particle diameter is 60 nm to 150 nm. On the other hand, when the average particle diameter is larger than 150 μm, in case when fine silica particles locate between a blade and a photoconductor surface, since some of the fine silica particles have the contacting areas of the same order of magnitude of the contacting areas of toner particles, some toner particles to be cleaned are not swept by the blade, that is, cleaning failure is often caused.

As the shape of the fine silica particle comes close to, in particular, the spherical shape, the fine silica particle acts more efficiently as a roller. In the present invention, coming close to the spherical shape means coming close to the circularity of approximate sphere, specifically means that the circularity is 0.95 or more.

In particular, the fine silica particles may be hydrophobized by various coupling agents, hexamethyldisilazane, dimethyldichlorosilane, octyltrimethoxysilane, and so forth.

As methods for externally adding and adhering the fine silica particles onto toner surfaces in the present invention, a method to mechanically mix and adhere the toner base particles and the fine silica particles using a variety of known mixing devices and a method to disperse uniformly in a liquid phase the toner base particles and the fine silica particles using a surfactant, and so forth and to dry them after an attachment treatment, and so forth are used.

A toner of the present invention, which is prepared using a toner binder according to the present invention, is mixed, as required, with carrier particles (such as ferrite), surfaces of which are coated with magnetic powder (such as iron powder, nickel powder, ferrite, and magnetite), glass beads and/or reisns (such as acrylic resins and silicone resins), to produce the mixture used as a developer for latent electrostatic images. Or, instead of using such carrier particles, the friction between the toner and members such as a charge blade are utilized to form a latent electrostatic image.

Next, the latent electrostatic image is fixed onto a sheet of transfer paper (such as paper and film) according to a known fixing method and so forth to produce the recorded paper.

In a preferred aspect of the present invention, a cleaning member in a cleaning unit for toner configured to remove a residual toner on a surface of an image bearing member is composed of an elastic blade, which makes it possible to remove certainly the residual toner.

In a preferred aspect of the present invention, a member in a fixing unit configured to fix the toner of the present invention is composed of a belt or sheet material, which realizes sufficient fixing property for the toner.

EXAMPLES

The present invention will be further specifically described by Examples and Comparative Examples below; however the scope of the present invention is not limited to the following Examples.

Synthesis Example 1

[Synthesis of Titanium-Containing Catalyst (a)]

A mixture of 1617 parts of titanium diisopropoxy bis(triethanolaminato) and 126 parts of ion-exchanged water was put into a reactor vessel equipped with a condenser tube, a stirrer and a nitrogen gas inlet tube capable of bubbling a liquid therein, the mixture was heated gradually to 90° C. and reacted at 90° C. for 4 hours (hydrolysis) while bubbling the liquid with nitrogen gas thereby to prepare titanium dihydroxy bis(triethanolaminato).

Each of titanium-containing catalysts (a) in Examples below was prepared in a similar synthetic method.

[Synthesis of noncrystalline polyester resin]

Three hundred and fifty parts of a bisphenol A EO dimolar adduct, 326 parts of a bisphenol A PO trimolar adduct, 278 parts of terephthalic acid, 40 parts of phthalic anhydride, and 2 parts of titanium dihydroxy bis(triethanolaminato) as a condensation catalyst were put into a reactor vessel equipped with a condenser tube, a stirrer, and a nitrogen gas inlet tube, and the mixture was reacted at 230° C. for 10 hours under nitrogen gas flow while distilling away water generated in the reaction. Then the reactants were reacted under a reduced pressure of 5 mmHg to 20 mmHg, and cooled to 180° C. when the acid value became 2 mgKOH/g or less, and 62 parts of trimellitic anhydride was added to the reactants, then the mixture was reacted under normal pressure of sealed atmosphere for 2 hours. After cooling to room temperature, the reaction product was pulverized to obtain nonlinear polyester resin AX1-1.

The AX1-1 thus obtained contained no THF-insoluble matter, and had an acid value of 35 mgKOH/g, a hydroxyl value of 17 mgKOH/g, a glass transition temperature Tg of 69° C., an Mn of 3,920, an Mw/Mn ratio of 4.5, an Mp of 11,200, a storage elastic modulus at 100° C. of $7.8 \times 10^4$ Pa, a storage elastic modulus at 150° C. of $4.5 \times 10^3$ Pa, and a softening temperature of 143° C. The rate of the components having molecular weights of 1,500 or less was 0.9%.

[Synthesis of Crystalline Polyester Resin]

Into a reactor vessel equipped with a condenser tube, a stirrer, and a nitrogen gas inlet tube, 398 parts of 1,6-hexanediol, 100 parts of 1,8-octanediol, 500 parts of succinic acid and 2 parts of titanium dihydroxy bis(triethanolaminato) as a condensation catalyst were put, and the mixture was reacted at 200° C. for 10 hours under nitrogen gas flow while distilling away water generated by the dehydration-condensation reaction. The reactants were further reacted at 8.0 kPa until when a resin having a softening point of 110° C. was obtained, to thereby obtain a resin AX2-1.

The AX2-1 thus obtained contained no THF-insoluble matter, and had an acid value of 12 mgKOH/g, a hydroxyl value of 22 mgKOH/g, a glass transition temperature Tg of 65° C., an Mn of 5,000, an Mp of 21,000, an Mw/Mn ratio of 4.5, a storage elastic modulus at 100° C. of $9.2 \times 10^2$ Pa, a storage elastic modulus at 150° C. of $5.2 \times 10^1$ Pa, and a softening temperature of 110° C. The rate of the components having molecular weights of 1,500 or less was 1.5%.

[Synthesis of Toner Binder]

Four hundred parts of the polyester AX1-1 and 600 parts of the polyester AX2-1 were melted-kneaded using a continuous kneader at a jacket temperature of 150° C. for a residence time of 3 minutes. The melted resin was cooled to 30° C. over 4 minutes using a steel-belt cooler, then pulverized to prepare a toner binder (TB-1) of the present invention.

Synthesis Example 2

[Synthesis of Noncrystalline Polyester Resin]

A noncrystalline polyester resin AX1-2 was prepared by a similar reaction to that in Synthesis Example 1 (AX1-1), followed by cooling to room temperature and pulverizing except that the polycondensation catalyst was changed to titanyl bis(triethanolaminato).

The AX1-2 thus obtained contained no THF-insoluble matter, and had an acid value of 33 mgKOH/g, a hydroxyl value of 14 mgKOH/g, a glass transition temperature Tg of 70° C., an Mn of 4,200, an Mw/Mn ratio of 4.6, an Mp of 11,800, a storage elastic modulus at 100° C. of $8.0 \times 10^4$ Pa, a storage elastic modulus at 150° C. of $4.7 \times 10^3$ Pa, and a softening temperature of 146° C. The rate of the components having molecular weights of 1,500 or less was 0.8%.

[Synthesis of Crystalline Polyester Resin]

A crystalline polyester resin AX2-2 was prepared by a similar reaction to that in Synthesis Example 1 (AX2-1), followed by cooling to room temperature and pulverizing except that the polycondensation catalyst was changed to titanyl bis(triethanolaminato).

The AX2-2 thus obtained contained no THF-insoluble matter, and had an acid value of 14 mgKOH/g, a hydroxyl value of 23 mgKOH/g, a glass transition temperature Tg of 65° C., an Mn of 4,700, an Mp of 26,000, an Mw/Mn ratio of 5.5, a storage elastic modulus at 100° C. of $9.5 \times 10^2$ Pa, a storage elastic modulus at 150° C. of $5.5 \times 10^1$ Pa, and a softening temperature of 112° C. The rate of the components having molecular weights of 1,500 or less was 0.9%.

[Synthesis of Toner Binder]

Five hundred parts of the polyester AX1-2 and 500 parts of the polyester AX2-2 were powder-mixed using a Henschel mixer for 5 min to obtain a toner binder resin (TB2) of the present invention.

Comparative Synthesis Example 1

[Synthesis of Noncrystalline Polyester Resin for Comparison]

A noncrystalline polyester resin for comparison was prepared by a similar reaction to that in Synthesis Example 1 (AX1-1), except that the polycondensation catalyst was changed to titanium tetraisopropoxide. The reactants were reacted under ordinary pressure for 16 hr and under reduced pressure for 8 hr. Since the reaction rate was slow, 2 parts of titanium tetrapropoxide was added 3 times during the reaction to obtain a noncrystalline polyester resin for comparison (CAX1-1).

The CAX1-1 thus obtained contained no THF-insoluble matter, and had an acid value of 34 mgKOH/g, a hydroxyl value of 16 mgKOH/g, a glass transition temperature Tg of 68° C., an Mn of 3,420, and an Mp of 12,100. The rate of the components having molecular weights of 1,500 or less was 2.1%.

[Synthesis of Crystalline Polyester Resin for Comparison]

A crystalline polyester resin for comparison was prepared by a similar reaction to that in Synthesis Example 1 (AX2-1), except that the polycondensation catalyst was changed to titanium tetraisopropoxide. The reactants were reacted under ordinary pressure for 16 hr and under reduced pressure for 8 hr. Since the reaction velocity was slow, 2 parts of titanium tetrapropoxide was added 3 times during the reaction to obtain a crystalline polyester resin for comparison (CAX2-1).

The CAX2-1 thus obtained contained no THF-insoluble matter, and had an acid value of 20 mgKOH/g, a hydroxyl value of 35 mgKOH/g, a glass transition temperature Tg of 60° C., an Mn of 18,000, an Mp of 28,000, an Mw/Mn ratio of 5.8, a storage elastic modulus at 100° C. of $6.2 \times 10^4$ Pa, a storage elastic modulus at 150° C. of $4.4 \times 10^3$ Pa, and a softening temperature of 140° C. The rate of the components having molecular weights of 1,500 or less was 11.6%.

[Synthesis of Toner Binder for Comparison]

Four hundred parts of the CAX1-1 and 600 parts of the CAX2-1 thus obtained were melted-kneaded using a continuous kneader at a jacket temperature of 150° C. for a residence time of 3 minutes. The melted resin was cooled to 30° C. in 4 minutes using a steel-belt cooler, then pulverized to prepare a toner binder for comparison (CTB1). The CTB1 thus obtained was a resin having a strong purplish brown color.

Examples 1 and 2 and Comparative Example 1

One hundred parts of any one of the obtained toner binders, i.e. TB1 and TB2 of the present invention and CTB1, 5 parts of Carnauba wax, and 4 parts of a yellow pigment (TONER YELLOW HG VP2155, supplied by Clariant (Japan) K.K.) were preliminarily mixed using a HENSCHEL MIXER (FM10B, manufactured by Mitsui Mining Co.) and then kneaded using a two-shaft kneader (PCM-30, manufactured by Ikegai Ltd.). The mixture was finely pulverized using a super sonic jet mill (LAB JET, manufactured by Japan Pneumatic Mfg. Co.) and then classified using an air classifier (MDS-I, manufactured by Japan Pneumatic Mfg. Co.) to prepare toner particles.

Then 0.5 parts of colloidal silica (AEROSIL R972, manufactured by Nippon Aerosil Co.) were mixed with 100 parts of each of the toner particles using a sample mill thereby to prepare toners T1, T2 and a toner for comparison CT1.

Synthesis Example 3

[Synthesis of Modified Polyester Resin]

Five hundred and forty-nine parts of a bisphenol A propyleneoxide dimolar adduct, 20 parts of a bisphenol A propyleneoxide trimolar adduct, 133 parts of a bisphenol A ethyleneoxide dimolar adduct, 10 parts of a phenol novolac (average polymerization degree: about 5) ethyleneoxide pentamolar adduct, 252 parts of terephthalic acid, 19 parts of isophthalic acid, 10 parts of trimellitic anhydride, and 2 parts of titanium dihydroxy bis(diethanolaminato) as a condensation catalyst were put into a reactor vessel equipped with a condenser tube, a stirrer, and a nitrogen gas inlet tube, and the mixture was reacted at 230° C. for 10 hours under nitrogen gas flow while distilling away water generated in the reaction. Then the reactants were reacted under a reduced pressure of 5 mmHg to 20 mmHg till the acid value became 2 mgKOH/g or less. Then 50 parts of trimellitic anhydride was added to the reactants, which were reacted under ordinary pressure for 1 hour. The reactants were reacted under reduced pressure of 20 mmHg to 40 mmHg, then 20 parts of bisphenol A diglycidyl ether was added to the reactants at the time when the softening temperature reached 105° C. The reaction products were taken out when the softening temperature reached 150° C. After cooling to room temperature, the reaction product was pulverized, to thereby obtain a modified polyester resin AY1-1.

The AY1-1 thus obtained had an acid value of 52 mgKOH/g, a hydroxyl value of 16 mgKOH/g, a glass transition temperature Tg of 73° C., an Mn of 1,860, an Mp of 6,550, an Mw/Mn ratio of 4.0, a storage elastic modulus at 100° C. of $1.3 \times 10^4$ Pa, a storage elastic modulus at 150° C. of $2.5 \times 10^3$ Pa, a softening temperature of 132° C., and a THF-insoluble matter content of 32%; the rate of the components having molecular weights of 1,500 or less was 1.0%.

[Synthesis of Toner Binder]

Five hundred parts of the polyester AY1-1 and 500 parts of the crystalline polyester resin AX2-2 were powder-mixed using a Henschel mixer for 5 min to obtain a toner binder resin (TB3) of the present invention.

[Synthesis of Modified Polyester Resin for Comparison]

A modified polyester resin for comparison (CAY1-2) was prepared by a similar reaction to that in Synthesis Example 3, except that the polycondensation catalyst was changed to titanium tetrabutoxide.

The CAY1-2 thus obtained had a softening temperature of 150° C., an acid value of 53 mgKOH/g, a hydroxyl value of 17 mgKOH/g, a glass transition temperature Tg of 71° C., an Mn of 1,660, an Mp of 6,340, an Mw/Mn ratio of 4.2, a storage elastic modulus at 100° C. of $1.6 \times 10^4$ Pa, a storage elastic modulus at 150° C. of $2.7 \times 10^3$ Pa, a softening temperature of 135° C., a THF-insoluble matter content of 34%, and a rate of the components having molecular weights of 1,500 or less of 3.1%.

[Synthesis of Toner Binder]

Five hundred parts of the polyester CAY1-2 and 500 parts of the crystalline polyester resin AX2-2 were powder-mixed using a Henschel mixer for 5 min to prepare a toner binder for comparison (CATB2) for use.

Synthesis Example 4

[Synthesis of Nonlinear Polyester Resin]

One hundred and thirty-two parts of a bisphenol A propyleneoxide dimolar adduct, 371 parts of a bisphenol A propyleneoxide trimolar adduct, 20 parts of a bisphenol A ethyleneoxide dimolar adduct, 125 parts of a phenol novolac (average polymerization degree: about 5) propyleneoxide pentamolar adduct, 201 parts of terephthalic acid, 25 parts of maleic anhydride, 35 parts of dimethylterephthalic acid ester, and 2 parts of titanylbis (triethanolaminato) as a condensation catalyst were put into a reactor vessel equipped with a condenser tube, a stirrer, and a nitrogen gas inlet tube, and the mixture was reacted at 230° C. for 10 hr under nitrogen gas flow while distilling away water generated in the reaction. Then the reactants were reacted under a reduced pressure of 5 mmHg to 20 mmHg, and cooled to 180° C. when the acid value became 2 mgKOH/g or less, and 65 parts of trimellitic anhydride was added to the reactants, then the mixture was reacted under normal pressure of sealed atmosphere for 2 hours. After cooling to room temperature, the reaction product was pulverized to obtain a nonlinear polyester resin AX2-3.

The nonlinear polyester resin AX2-3 thus obtained had an acid value of 30 mgKOH/g, a hydroxyl value of 16 mgKOH/g, a Tg of 59° C., an Mn of 1,410, an Mp of 4,110, an Mw/Mn ratio of 4.2, a storage elastic modulus at 100° C. of $8.8 \times 10^4$ Pa, a storage elastic modulus at 150° C. of $1.1 \times 10^4$ Pa, a softening temperature of 144° C., a THF-insoluble matter content of 27%, and a rate of the components having molecular weights of 1,500 or less of 1.0%.

[Synthesis of Toner Binder]

Five hundred parts of the polyester AX2-3 and 500 parts of the crystalline polyester resin AX2-2 were powder-mixed using a Henschel mixer for 5 min to prepare a toner binder (TB4).

Examples 3 and 4 and Comparative Example 2

One hundred parts of any one of the obtained toner binders, i.e. TB3 and TB4 of the present invention and CTB2, 8 parts of carbon black (MA-100, manufactured by Mitsubishi Chemical Corporation), 5 parts of Carnauba wax, and one part of a charge control agent (T-77, manufactured by Hodogaya Chemical Co., LTD.) were preliminarily mixed using a HENSCHEL MIXER (FM10B, manufactured by Mitsui Mining Co.) and then kneaded using a two-shaft kneader (PCM-30, manufactured by Ikegai Ltd.). The mixture was finely pulverized using a super sonic jet mill (LAB JET, manufactured by Japan Pneumatic Mfg. Co.) and then classified using an air classifier (MDS-I, manufactured by Japan Pneumatic Mfg. Co.) to prepare toner particles.

Then 0.3 part of colloidal silica (AEROSIL R972, manufactured by Nippon Aerosil Co.) was mixed with 100 parts of each of the toner particles using a sample mill thereby to prepare toner T3 and T4 and toner for comparison CT2.

Example 5 and Comparative Example 3

One hundred parts of any one of the obtained toner binders, i.e. TB4 of the present invention and CTB2,8 parts of carbon black (MA-100, manufactured by Mitsubishi Chemical Corporation), 5 parts of Carnauba wax, one part of a charge control agent (T-77, manufactured by Hodogaya Chemical Co., LTD.), and 5 parts of fatty acid amide (KAO WAX EB-FF, manufactured by Kao Corporation) were preliminarily mixed using a HENSCHEL MIXER (FM10B, manufactured by Mitsui Mining Co.) and then kneaded using a two-shaft kneader (PCM-30, manufactured by Ikegai Ltd.). The mixture was finely pulverized using a super sonic jet mill (LAB JET, manufactured by Japan Pneumatic Mfg. Co.) and then classified using an air classifier (MDS-I, manufactured by Japan Pneumatic Mfg. Co.) to prepare toner particles.

Then 0.3 part of colloidal silica (AEROSIL R972, manufactured by Nippon Aerosil Co.) was mixed with 100 parts of each of the toner particles using a sample mill to thereby prepare a toner T5 and a toner for comparison CT3.

Synthesis Example 5

<Synthesis Example of Polyester Resin>

[Synthesis of Nonlinear Polyester Resin]

Four hundred and ten parts of a bisphenol A propyleneoxide dimolar adduct, 270 parts of a bisphenol A propyleneoxide trimolar adduct, 110 parts of terephthalic acid, 125 parts of isophthalic acid, 15 parts of maleic anhydride, and 2 parts of titanium dihydroxy bis(triethanolaminato) as a condensation catalyst were put into a reactor vessel equipped with a condenser tube, a stirrer, and a nitrogen gas inlet tube, and the mixture was reacted at 220° C. for 10 hr under nitrogen gas flow while distilling away water generated in the reaction. Then the reactants were reacted under a reduced pressure of 5 mmHg to 20 mmHg (5 Torr to 20 Torr (ca. 666 Pa to ca. 2,666 Pa)), and cooled to 180° C. when the acid value became 2 mgKOH/g or less, and 25 parts of trimellitic anhydride was added to the reactants, then the mixture was reacted under normal pressure of sealed atmosphere for 2 hours. After cooling to room temperature, the reaction product was pulverized to obtain nonlinear polyester resin AX2-4.

The AX2-4 thus obtained contained no THF insoluble matter, and had an acid value of 18 mgKOH/g, a hydroxyl value of 37 mgKOH/g, a Tg of 62° C., an Mn of 2,130, an Mp of 5,350, an Mw/Mn ratio of 3.3, a storage elastic modulus at 100° C. of $9.0 \times 10^2$ Pa, a storage elastic modulus at 150° C. of $8.0 \times 10^1$ Pa, and a softening temperature of 117° C. The rate of the components having molecular weights of 1,500 or less was 1.3%.

[Synthesis of Modified Polyester Resin]

Three hundred and seventeen parts of a bisphenol A ethyleneoxide dimolar adduct, 57 parts of a bisphenol A propyleneoxide dimolar adduct, 298 parts of a bisphenol A propyleneoxide trimolar adduct, 75 parts of a phenol novolac (average polymerization degree: about 5) propyleneoxide pentamolar adduct, 30 parts of isophthalic acid, 157 parts of terephthalic acid, 27 parts of maleic anhydride, and 2 parts of titanium dihydroxy bis(triethanolaminato) as a condensation catalyst were put into a reactor vessel equipped with a condenser tube, a stirrer, and a nitrogen gas inlet tube, and the mixture was reacted at 230° C. for 10 hours under nitrogen gas flow while distilling away water generated in the reaction. Then the reactants were reacted under a reduced pressure of 5 mmHg to 20 mmHg and cooled to 180° C. when the acid value became 2 mgKOH/g or less. Then 68 parts of trimellitic anhydride was added to the reactants, which was reacted under ordinary pressure for 1 hour. Subsequently the reactants were reacted under reduced pressure of 20 mmHg to 40 mmHg, then 25 parts of bisphenol A diglycidyl ether were added to the reactants at the time when the softening temperature reached 120° C. The reaction products were taken out when the softening temperature reached 155° C. After cooling to room temperature, the reaction products were pulverized, to thereby obtain a modified polyester resin AY1-2.

The AY1-2 thus obtained had an acid value of 11 mgKOH/g, a hydroxyl value of 27 mgKOH/g, a Tg of 60° C., an Mn of 3,020, an Mp of 6,030, an Mw/Mn ratio of 4.4, a storage elastic modulus at 100° C. of $7.6 \times 10^4$ Pa, a storage elastic modulus at 150° C. of $4.2 \times 10^3$ Pa, a softening temperature of 140° C., and a THF-insoluble matter content of 35%. The rate of the components having molecular weights of 1,500 or less was 1.1%.

[Synthesis of Toner Binder]

Five hundred parts of the AX2-4 and 500 parts of the AY1-2 were melted-kneaded using a continuous kneader at a jacket temperature of 150° C. for a residence time of 3 minutes. The melted resin was cooled to 30° C. in 4 minutes using a steel-belt cooler, then pulverized to prepare a toner binder TB5 of the present invention.

Example 6

[Preparation of Resin Dispersion (1)]

The toner binder (TB5) prepared in the Synthetic Example 5 was melt-kneaded by a continuous kneader at a jacket temperature of 150° C. for a residence time of 3 min. Then, into an aqueous medium tank prepared separately, 0.37% of diluted ammonia water diluted with ion-exchange water was placed and, while heated at 120° C. by a heat exchanger, transferred at a flow rate of 0.05 L/min to the wet-type emulsion device (CAVITRON, supplied by EUROTEC Ltd.) at the same time as the above mentioned polyester resin melted body (its transfer rate is 100 g/min). Resin dispersion (1) (resin particle concentration: 30%) made of polyester resins of a volume average particle diameter of 0.14 μm was prepared by operating the wet-type emulsion device under the conditions of a rotation speed of the rotator of 60 Hz and a pressure of 5 kg/cm².

[Preparation of Releasing Agent Dispersion]

Materials:

Paraffin wax (manufactured by NIPPON SEIRO Co., Ltd., FNP0090, melting point: 90° C.) . . . 59.5 parts by mass Anionic surfactant (manufactured by Dai-ichi Kogyo Seiyaku Co., Ltd, NEOGEN RK) . . . 5 parts by mass Ion-exchange water . . . 200 parts by mass.

The above materials were heated at 110° C., dispersed using a homogenizer (manufactured by IKA® Jappan K.K., Ultraturrax T50), and subjected to dispersion treatment using a HIGH PRESSURE MANTON GAULIN HOMOGENIZER (manufactured by Gaulin Co., Ltd.) to prepare releasing agent dispersion (concentration of the releasing agent: 22.5%) made of releasing agents having a volume average particle diameter of 225 nm.

[Preparation of Colorant Dispersion]

Cyan pigment (manufactured by TOYO INK MFG. Co., Ltd., Pigment Blue 15:3 (copper phthalocyanine)) . . . 2,500 parts by mass Anionic surfactant (manufactured by Dai-ichi Kogyo Seiyaku Co., Ltd, NEOGEN R) . . . 150 parts by mass Ion-exchange water . . . 8,500 parts by mass The above materials were mixed, dissolved, and dispersed for about one hour using ULTIMIZER, a high-pressure-impact-type disperser, (manufactured by Sugino Machine Limited, HJP30006) to prepare colorant dispersion in which a colorant (cyan pigment) was dispersed. The average particle diameter of the colorant (cyan pigment) in the colorant dispersion was 0.13 μm, the colorant particle concentration in the colorant dispersion was 24%.

[Preparation of Core Particle Dispersion]

Polyester resin dispersion (1) . . . 350 parts by mass

Anionic surfactant (TAYCA POWER BN2060) . . . 6.0 parts by mass

Colorant dispersion . . . 18.0 parts by mass

Releasing agent dispersion (1) . . . 40.0 parts by mass

Nonionic surfactant (IGEPAL C0897 . . . 1.3 parts by mass

Into a 5-L cylindrical stainless container, 350 parts by mass of the polyester resin dispersion (1), 40.0 parts by mass of the releasing agent dispersion (1), and 285 parts by mass of deionized water were put, heated at 80° C., to which 6.0 parts by mass of an anionic surfactant was added, and the resultant mixture was stirred at 150 rpm for 30 min and then cooled to room temperature. Subsequently to the mixture which was cooled to room temperature, 18.0 parts by mass of the colorant dispersion, 1.3 parts by mass of non-ionic surfactant, and 2.74 parts by mass of 10% of polyaluminum chloride in a nitric acid aqueous solution as a flocculant were added and homogenized with a shearing force at 6,000 rpm for 5 min using Ultraturrax. At this time dispersing and mixing were performed with the pH of the materials adjusted to 3.0 by addition of nitric acid. Since viscosity of the material solution increased, the material solution was sufficiently stirred until it became homogenous, when it was set in a polymerization kettle equipped with a stirring device and a thermometer.

Then, while the stirring speed was kept at 500 rpm, the temperature was increased at a rate of 1° C./min by a mantle heater until it reached 40° C., when the stirring speed was raised to 530 rpm. The temperature was continued to be increased to enhance the increase in the volume average particle diameter by aggregation until it reached 55° C., when the temperature increase was stopped, the stirring speed was reduced to 450 rpm, and the material solution was started to stand in this state for one hour. To stop the increase in the volume average particle diameter, the pH was raised to 8.0 and the stirring speed was further reduced to 200 rpm. Next, to fuse aggregated particles, the temperature was raised to 75° C. and the material solution was kept at 75° C. for 10 min. After the aggregated particles were confirmed to have been fused in indeterminate shapes by microscopic observation, ice-cold water was poured in and the material solution was rapidly cooled at a temperature falling rate of 100° C./min to stop completely the increase in the volume average particle diameter. This dispersion was further concentrated by a centrifuge separator such that the solid content of the dispersion became 20% (the dispersion thus prepared was core particle dispersion 1).

[Preparation of Crystalline Polyester Resin Dispersion A]

Into a three-neck flask dried by heating, acid components (2 mol % of sodium dimethyl isophthalate-5-sulfonic acid and 7.5 mol % of 5-t-butylisophthalic acid), 100 mol % of 1,9-nonanediol, and normal-butyl tin oxide ((n-Bu)$_2$SnO; 0.05% to the acid components) were put, air pressure in the flask was reduced, and the mixture was heated at 185° C. while being mechanically stirred under an inactive gas atmosphere of nitrogen. After one and a half hours of stirring, the contents of the flask were melted and became transparent, then the mantle heater was removed once and 90.5 mol % of 1,10-dodecanedioic acid was introduced from an opening of the flask. Again, the atmosphere in the flask was changed to an inactive gas atmosphere of nitrogen, and the contents of the flask were refluxed for 6 hr. Subsequently the temperature in the flask was increased gradually to 220° C. through reduced-pressure distillation, and the contents of the flask were stirred for 4 hr. When the contents of the flask became viscous, the molecular weight of the product was confirmed by GPC, and when the weight average molecular weight of the product became 19,200, the reduced-pressure distillation was stopped and a crystalline polyester resin AX3-1 was thereby obtained.

Next, the product was transferred at a transfer rate of 100 g/min to the wet-type emulsion device (CAVITRON CD1010, supplied by EUROTEC Ltd.) while the product was kept in the melt state. Then, into an aqueous medium tank prepared separately, 0.37% of ammonia water that had been diluted with ion-exchange water was placed and, while heated at 120° C. by a heat exchanger, transferred at a flow rate of 0.1 L/min to the wet-type emulsion device together with the above mentioned polyester resin melt body. A crystalline polyester resin dispersion A (resin particle concentration: 21%) made of crystalline polyester resin having a volume average particle diameter of 0.22 μm was prepared while maintaining this state by operating the CAVITRON under the conditions of a rotation speed of the rotator of 60 Hz and a pressure of 5 kg/cm².

[Preparation of Toner Base Particles 1]

Then, the temperature of the core particle dispersion 1 was increased to 50° C., 15 parts by mass of the resin dispersion (1) and 15 parts by mass of the crystalline polyester resin dispersion A were added for the purpose of coating particle surfaces, and the pH of the dispersion was decreased to 3.2. Subsequently in order to enhance adsorption and coating of the coating particles onto surfaces of core fusion particles, 0.14 parts by mass of a flocculant (10% of polyaluminum chloride in a nitric acid aqueous solution) was added, and to enhance fusion-bonding of the particles on the surfaces of core fusion particles, the resultant mixture was kept at 50° C. for 5 hr. After amorphous polymer coating layers were confirmed to have been fusion bonded by electron microscopic observation, for the purpose of washing particle surfaces, the pH of the dispersion was raised to 9.5 by a 1 N sodium hydroxide aqueous solution to perform alkali washing. After the dispersion was filtered once, a cycle of dispersion and washing with deionized water was repeated three times, further the particle slurry was washed at 40° C. with its pH being adjusted at 4.1 by a 0.3 N nitric acid aqueous solution, and finally the particle slurry was washed with deionized heated water (40° C.).

Next, in an aqueous solvent in a tank in which a 1% concentration of fluorine compound (1) of the following chemical formula was dispersed, the fluorine compound (1) was mixed with the toner base particles so that the concentration of the fluorine compound (1) in particles is 0.1%. After the fluorine compound was attached (bound), the particles are dried at 45° C. for 48 hr by a wind-circulating drying machine, and further dried on a shelf at 30° C. for 10 hr. Then the particles are passed through a sieve of a mesh size of 75 μm to prepare toner base particles 1.

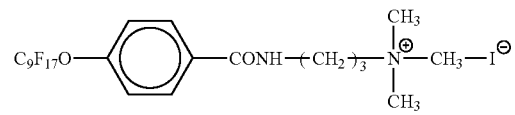

The toner base particles 1 were dried to obtain toner material particles (1).

Next, 0.5 parts by mass of hydrophobic silica (H-2000 (hydrophobizing degree: 70%; BET specific surface area: 140 m²/g), manufactured by Clariant Japan K.K.), 1.0 part by mass of a titanium oxide (MT-150A (hydrophobizing degree: 65%; BET specific surface area: 65 m²/g), manufactured by TAYCA Corporation), and 1.0 part by mass of silica having a volume average particle diameter of 0.1 μm and a substantially spherical shape were added to 100 parts by mass of the toner material particles thus obtained. These were mixed by a Henschel mixer at a circumferential rate of 40 m/sec for 60 sec, and the mixture was classified with a sieve of a mesh size of 90 μm to prepare a toner of Example 6 (T6).

The weight average particle diameter (D4) of the toner T6 thus obtained was 5.5 μm, and the D4/Dn was 1.15.

Ferrite (F-300, manufactured by Powdertech K.K.) was spray-coated with a coating solution that had been prepared by dispersing in toluene a silicone resin treated with an aminosilane coupling agent, to produce a carrier having a coating resin layer thickness of 0.4 μm. Seven parts by mass of the toner T6 thus obtained and 93 parts by mass of the carrier were uniformly mixed by a turbular mixer for 3 min to prepare a two-component developer for evaluation.

In addition to the toner T6, prepared at the same time were, a magenta toner in which 3,500 parts by mass of a magenta pigment (PIGMENT RED 146 (a naphthol pigment), manufactured by Clariant Japan K.K.) was used in place of 2,500 parts by mass of the cyan pigment, a yellow toner in which 3,000 parts by mass of a yellow pigment (PIGMENT YELLOW 180 (a benzimidazolone pigment), manufactured by Clariant Japan K.K.) was used in place of 2,500 parts by mass of the cyan pigment, and a black toner in which 4,000 parts by mass of carbon black (#44, manufactured by Mitsubishi Chemical Corporation) was used in place of 2,500 parts by mass of the cyan pigment.

The particle diameter distribution, the shape distribution, the average dispersion particle diameter of the colorant, the average dispersion particle diameter of the releasing agent, and the amount of the releasing agent present in the vicinity of the surfaces ([amount of releasing agent]/([amount of releasing agent]+[amount of resin])) of toners of the above mentioned Examples 1 to 6 and Comparative Examples 1 to 3 were shown in Table 1.

TABLE 1

| | | Particle diameter distribution | | | Shape distribution | | Dispersion | | |
|---|---|---|---|---|---|---|---|---|---|
| | Toner | Weight average particle diameter (D4: μm) | Number average particle diameter (Dn: μm) | D4/Dn | Average circularity | Rate of particles having circularity of 0.93 to 0.97 (%) | Average dispersion diameter of colorant (nm) | Average dispersion diameter of releasing agent (μm) | Amount of releasing agent in the vicinity of surface (%) |
| Ex. 1 | T1 | 8.1 | 6.7 | 1.21 | 0.93 | 72 | 50 | 0.6 | 16 |
| Ex. 2 | T2 | 8.3 | 6.7 | 1.24 | 0.93 | 77 | 55 | 0.7 | 18 |
| Ex. 3 | T3 | 7.6 | 6.1 | 1.25 | 0.92 | 69 | 60 | 0.8 | 15 |
| Ex. 4 | T4 | 8.2 | 6.4 | 1.28 | 0.94 | 74 | 65 | 0.9 | 19 |
| Ex. 5 | T5 | 7.2 | 6.2 | 1.16 | 0.94 | 80 | 70 | 0.6 | 17 |

TABLE 1-continued

|  | Toner | Particle diameter distribution | | | Shape distribution | | Dispersion | | |
|---|---|---|---|---|---|---|---|---|---|
|  |  | Weight average particle diameter (D4: μm) | Number average particle diameter (Dn: μm) | D4/Dn | Average circularity | Rate of particles having circularity of 0.93 to 0.97 (%) | Average dispersion diameter of colorant (nm) | Average dispersion diameter of releasing agent (μm) | Amount of releasing agent in the vicinity of surface (%) |
| Ex. 6 | T6 | 5.5 | 4.8 | 1.15 | 0.96 | 85 | 45 | 0.8 | 8 |
| Comp. Ex. 1 | CT1 | 10.2 | 8.0 | 1.28 | 0.89 | 31 | 80 | 1.8 | 20 |
| Comp. Ex. 2 | CT2 | 11.1 | 8.1 | 1.37 | 0.89 | 26 | 60 | 1.7 | 30 |
| Comp. Ex. 3 | CT3 | 9.2 | 7.0 | 1.31 | 0.88 | 12 | 55 | 0.8 | 15 |

The evaluation results of the toners according to the following evaluation methods are shown in Table 2.

[Evaluation Method]

(1) Low Temperature Fixing Property (Peeling Property with Tape)

A developer was prepared by mixing 4 parts by mass of each of the toners and a silicone-coated ferrite carrier (average particle diameter: 100 μm; manufactured by Kanto Denka Kogyo Co.) for 5 min using a turbular mixer. The developer was put into a copier (IMAGIO 105, manufactured by Ricoh Company Ltd.) that had been modified so as to fix a toner image outside the copier, and an unfixed image of 2 cm×12 cm in size was formed with the toner adhesion amount adjusted to 0.5 mg/cm².

Then the unfixed image was fixed at a linear velocity of 1,500 mm/sec, while keeping the temperature of the fixing roller at 150° C., to perform a fixing test. The fixing paper was RICOPY PPC paper Type 6000 (manufactured by Ricoh Company Ltd.).

A SCOTCH TAPE (manufactured by Sumitomo 3M Ltd.) was affixed to the image formed at the fixing temperature and allowed to stand for 3 hr, then the tape was peeled off and disposed on a white paper. The density of the unfixed image adhered on the tape was measured by X-RITE 938 (manufactured by X-Rite Co.); the difference in density from that of the blank being 0.300 or more was evaluated as "unfixed", and the low temperature-fixing property was evaluated according to the following evaluation criteria.

[Evaluation Criteria]

A: the difference in density from blank being less than 0.150
B: the difference in density from blank being 0.150 to less than 0.300
C: the difference in density from blank being 0.300 or more (2) Hot Offset Resistance

[Evaluation Method]

A developer was prepared by mixing 4 parts by mass of each of the toners and a silicone-coated ferrite carrier (average particle diameter: 100 μm; manufactured by Kanto Denka Kogyo Co.) for 5 min using a turbular mixer. The developer was put into a copier (IMAGIO 105, manufactured by Ricoh Company Ltd.) that had been modified so as to fix a toner image outside the copier, and an unfixed image of 2 cm×12 cm in size was formed with the toner adhesion amount adjusted to 1.0 mg/cm².

Then the unfixed image was fixed at a linear velocity of 250 mm/sec, while increasing the temperature of the fixing roller stepwise from 100° C. to 250° C. with an increment of 5° C., to perform a fixing test. The fixing paper was RICOPY PPC paper Type 6000 (manufactured by Ricoh Company Ltd.)

Occurrence or nonoccurrence of hot offset phenomenon of the fixed images obtained at each of the fixing temperatures on the fixing paper was observed visually, and the hot offset resistance was evaluated according to the following criteria

[Evaluation Criteria]

A: Hot offset occurred at 250° C. or higher.
B: Hot offset occurred at 200° C. to lower than 250° C.
C: Hot offset occurred at lower than 200° C.

(3) Blocking Resistance

[Evaluation Method]

Ten grams of each of the toners prepared in Examples and Comparative Examples was put in a 100-ml glass bottle and allowed to stand for one day in an incubator at 50° C. The blocking resistance was evaluated, by observing the state of the toner, according to the following criteria.

[Evaluation Criteria]

A: no blocking observed
B: in a soft caking state
C: in a hard caking state

TABLE 2

|  | Toner | Low temperature-fixing property | Hot offset resistance | Blocking resistance |
|---|---|---|---|---|
| Ex. 1 | T1 | B | B | B |
| Ex. 2 | T2 | B | B | B |
| Ex. 3 | T3 | B | A | B |
| Ex. 4 | T4 | B | A | B |
| Ex. 5 | T5 | A | A | A |
| Ex. 6 | T6 | B | A | B |
| Comp. Ex. 1 | CT1 | C | B | C |
| Comp. Ex. 2 | CT2 | C | B | C |
| Comp. Ex. 3 | CT3 | B | A | C |

The results shown in Table 2 demonstrated that toner of the present invention has favorable low temperature-fixing property and hot offset resistance and causes no blocking of toner even at high temperature and high humidity conditions.

It was found that the toner of the present invention, which contains a polycondensation polyester resin of the present invention and is prepared by a toner production method of the present invention, is excellent in both blocking resistance and low temperature-fixing property at high temperature and humidity conditions, and is favorable in storage stability, melting-flowability, charging characteristics, and cleaning ability. It was found that a toner having favorable resin characteristics can be obtained without using as a catalyst a tin compound that is environmentally harmful.

INDUSTRIAL APPLICABILITY

The toner of the present invention, which contains a toner binder of the present invention and is prepared by a toner production method of the present invention, is excellent in both blocking resistance of toner at a high temperature, low temperature-fixing property, and offset resistance, and therefore is useful as an electrostatic image developing toner.

What is claimed is:

1. An electrostatic image developing toner comprising:
a toner binder,
a colorant, and
a releasing agent,
wherein the toner binder contains at least one noncrystalline polyester resin (A) and a crystalline polyester resin (B), and the at least one noncrystalline polyester resin (A) and/or the crystalline polyester resin (B) are/is formed in the presence of at least one titanium- containing catalyst (a) expressed by any one of General Formulas (I) and (II),

  (I)

  (II)

where X is a residue resulting from removing a hydrogen atom in one hydroxyl group from mono-alkanolamine or poly-alkanolamine having 2 to 12 carbon atoms, a second hydroxyl group in the polyalkanolamine may be intramolecularly polycondensed with a third hydroxyl group directly bound to the same Ti atom to form a cyclic structure or may be intermolecularly polycondensed with a fourth hydroxyl group directly bound to other Ti atom to form a repeating structure; when the repeating structure is formed, the polymerization degree is 2 to 5; R represents an H atom or an alkyl group that has 1 to 8 carbon atoms and may contain 1 to 3 ether bonds; "m" is an integer of 1 to 4; "n" is an integer of 0 to 3; the sum of "m" and "n" is 4; "p" is an integer of 1 to 2; "q" is an integer of 0 to 1; the sum of "p" and "q" is 2; when "m" or "p" is 2 or more, each X may be the same or different,
wherein the electrostatic image developing toner is used in an image forming apparatus which develops an electrostatic image on a latent image bearing member using the toner to form a toner image, transfers the toner image onto a transfer medium, and fixes the toner image on the transfer medium by heating and/or pressurizing the toner image.

2. The electrostatic image developing toner according to claim 1, wherein the electrostatic image developing toner is produced by pulverization after melt-kneading.

3. The electrostatic image developing toner according to claim 1, wherein the electrostatic image developing toner is obtained by emulsifying, dispersing, and agglutinating, in an aqueous medium, particles which contain particles of the at least one noncrystalline polyester resin (A) and particles of the crystalline polyester resin (B).

4. The electrostatic image developing toner according to claim 3, wherein the electrostatic image developing toner has a core-shell structure comprising a core portion formed of core particles containing core resin particles (C), and a shell portion formed of fine shell particles containing shell resin particles (S).

5. The electrostatic image developing toner according to claim 4, wherein the electrostatic image developing toner is produced by a method which comprises:
forming the core particles containing the core resin particles (C) which contain particles of the noncrystalline polyester resin (A) and/or particles of the crystalline polyester resin (B) by heat-fixing the core resin particles (C) while agglutinating the core resin particles (C) to prepare a core particle dispersion,
forming shell-formed particles by adding and mixing the shell resin particles (S) in the core particle dispersion so as to attach shell fine particles containing the shell resin particles (S) to surfaces of the core particles, and
heating a dispersion of the shell-formed particles.

6. The electrostatic image developing toner according to claim 5, wherein the shell resin particles (S) contain particles of the noncrystalline polyester resin (A).

7. The electrostatic image developing toner according to claim 4, wherein the core portion of the core-shell structure contains particles of the crystalline polyester resin (B).

8. The electrostatic image developing toner according to claim 5, wherein the mixing ratio by mass (C):(S) of the core resin particles (C) to the shell resin particles (S) is in the range of 50:50 to 90:10.

9. The electrostatic image developing toner according to claim 1, wherein X in any one of the General Formulas (I) and (II) is a residue resulting from removing a hydrogen atom in one hydroxyl group from di-alkanolamine or tri-alkanolamine.

10. The electrostatic image developing toner according to claim 1, wherein any one of "m" and "p" in the General Formulas (I) and (II) is an integer of 2 or more and all of a plurality of Xs represent the same group.

11. The electrostatic image developing toner according to claim 1, wherein at least part of the noncrystalline polyester resin (A) and/or the crystalline polyester resin (B) is modified with a polyepoxide (c).

12. The electrostatic image developing toner according to claim 1, wherein the noncrystalline polyester resin (A) has a glass transition temperature of 50° C. to 80° C., a softening point of 80° C. to 130° C., and an acid value of 0.2 mgKOH/g to 50 mgKOH/g.

13. The electrostatic image developing toner according to claim 1, wherein the number average molecular weight (Mn) of the noncrystalline polyester resin (A) is in the range of 1,000 to 10,000, and a ratio (Mw/Mn) of the weight average molecular weight (Mw) to the number average molecular weight (Mn) of the noncrystalline polyester resin (A) is in the range of 2 to 10.

14. The electrostatic image developing toner according to claim 1, wherein the storage elastic modulus of the noncrystalline polyester resin (A) at 100° C. is in the range of $10^3$ Pa to $10^6$ Pa and the storage elastic modulus of the noncrystalline polyester resin (A) at 150° C. is in the range of $10^2$ Pa to $10^4$ Pa.

15. The electrostatic image developing toner according to claim 1, wherein the non crystalline polyester resin (A) contains as a copolymer component a divalent carboxylic acid having a sulfonic acid group.

16. The electrostatic image developing toner according claim 1, wherein the average dispersion particle diameter of the colorant in the toner is in the range of 0.05 μm to 0.50 μm.

17. The electrostatic image developing toner according to claim 1, wherein the amount of the releasing agent present in the vicinity of a surface of the toner ([amount of releasing agent]/{[amount of releasing agent]+[amount of resin]}) is in the range of 0.5% by mass to 10% by mass.

18. The electrostatic image developing toner according to claim 1, further comprising a fatty acid amide and/or fine inorganic particles.

19. An image forming apparatus comprising:
- a latent image bearing member configured to bear a latent image for forming an electrophotographic image,
- a developing unit configured to develop the latent image on the latent image bearing member using a toner in the developing unit,
- a transfer unit configured to transfer a toner image formed on a surface of the latent image bearing member to a transfer medium,
- a cleaning unit configured to remove a residual toner remaining on a surface of the image bearing member, and
- a fixing unit configured to fix the toner image transferred onto the transfer medium by heating and/or pressurizing the toner image,
- wherein a member in the cleaning unit configured to remove the residual toner comprises an elastic blade, and the toner is
- an electrostatic image developing toner which comprises
- a toner binder,
- a colorant, and
- a releasing agent,
- wherein the toner binder contains at least one noncrystalline polyester resin (A) and a crystalline polyester resin (B), and the at least one noncrystalline polyester resin (A) and/or the crystalline polyester resin (B) are/is formed in the presence of at least one titanium-containing catalyst (a) expressed by any one of General Formulas (I) and (II), $$\text{Ti}(-X)m(-OH)n \quad (I)$$

$$O=\text{Ti}(-X)p(-OR)q \quad (II)$$

where X is a residue resulting from removing a hydrogen atom in one hydroxyl group from mono-alkanolamine or poly-alkanolamine having 2 to 12 carbon atoms, a second hydroxyl group in the polyalkanolamine may be intramolecularly polycondensed with a third hydroxyl group directly bound to the same Ti atom to form a cyclic structure or may be intermolecularly polycondensed with a fourth hydroxyl group directly bound to other Ti atom to form a repeating structure; when the repeating structure is formed, the polymerization degree is 2 to 5; R represents an H atom or an alkyl group that has 1 to 8 carbon atoms and may contain 1 to 3 ether bonds; "m" is an integer of 1 to 4; "n" is an integer of 0 to 3; the sum of "m" and "n" is 4; "p" is an integer of 1 to 2; "q" is an integer of 0 to 1; the sum of "p" and "q" is 2; when "m" or "p" is 2 or more, each X may be the same or different, wherein the electrostatic image developing toner is used in the image forming apparatus which develops the electrostatic image on the latent image bearing member using the toner to form a toner image, transfers the toner image onto the transfer medium, and fixes the toner image on the transfer medium by heating and/or pressurizing the toner image.

20. The image forming apparatus according to claim 19, wherein a member in the fixing unit configured to fix the toner image comprises a belt or sheet material.

* * * * *